(12) United States Patent  (10) Patent No.: US 8,411,326 B2
Inoue  (45) Date of Patent: Apr. 2, 2013

(54) IMAGE FORMING APPARATUS AND METHOD FOR USING SELECTED CORRECTION TABLE BASED ON DIVIDED AREA OF A RECORDING MEDIUM

(75) Inventor: Yoshiaki Inoue, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 840 days.

(21) Appl. No.: 12/569,607

(22) Filed: Sep. 29, 2009

(65) Prior Publication Data

US 2010/0079816 A1    Apr. 1, 2010

(30) Foreign Application Priority Data

Sep. 30, 2008 (JP) .................................. 2008-253434

(51) Int. Cl.
 *H04N 1/40* (2006.01)
(52) U.S. Cl. ........ 358/3.23; 358/1.3; 358/1.9; 358/1.13; 382/167
(58) Field of Classification Search .................. None
See application file for complete search history.

(56) References Cited

U.S. PATENT DOCUMENTS

| | | | | |
|---|---|---|---|---|
| 6,020,976 | A * | 2/2000 | Fujita et al. | 358/1.3 |
| 6,396,595 | B1 * | 5/2002 | Shimazaki | |
| 6,819,439 | B2 * | 11/2004 | Hayashi et al. | 358/1.13 |
| 6,843,610 | B2 | 1/2005 | Ioka et al. | |
| 7,123,379 | B2 * | 10/2006 | Nishida et al. | 358/1.9 |
| 7,187,472 | B2 | 3/2007 | Friedman et al. | |
| 2004/0240749 | A1 | 12/2004 | Miwa et al. | |
| 2008/0317338 | A1 * | 12/2008 | Shirai | 382/167 |
| 2009/0051721 | A1 * | 2/2009 | Takahashi et al. | 347/16 |

FOREIGN PATENT DOCUMENTS

| | | |
|---|---|---|
| JP | 8-123940 A | 5/1996 |
| JP | 2003-291325 A | 10/2003 |
| JP | 2004-090648 A | 3/2004 |
| JP | 2004-320723 A | 11/2004 |
| JP | 2007-59989 A | 3/2008 |

* cited by examiner

*Primary Examiner* — Dung Tran
(74) *Attorney, Agent, or Firm* — Birch, Stewart, Kolasch & Birch, LLP

(57) ABSTRACT

The image forming apparatus includes: an area tone setting device which sets an arbitrary tone correction table for each of image forming areas obtained by dividing a recording medium into a plurality of areas; a tone correction table storage device which stores tone correction tables set respectively for the image forming areas by the area tone setting device; an area judgment device which judges the image forming areas on which respective pixels constituting input image data are to be printed; a tone correction table selection device which selects from the tone correction table storage device one of the tone correction tables corresponding to the image forming area judged by the area judgment device; and a tone correction device which performs tone correction of each pixel constituting the input image data, using the tone correction table selected by the tone correction table selection device.

13 Claims, 20 Drawing Sheets

PAPER CONVEYANCE
DIRECTION: y DIRECTION

PAPER BREADTHWAYS
DIRECTION: x DIRECTION

FIG.14
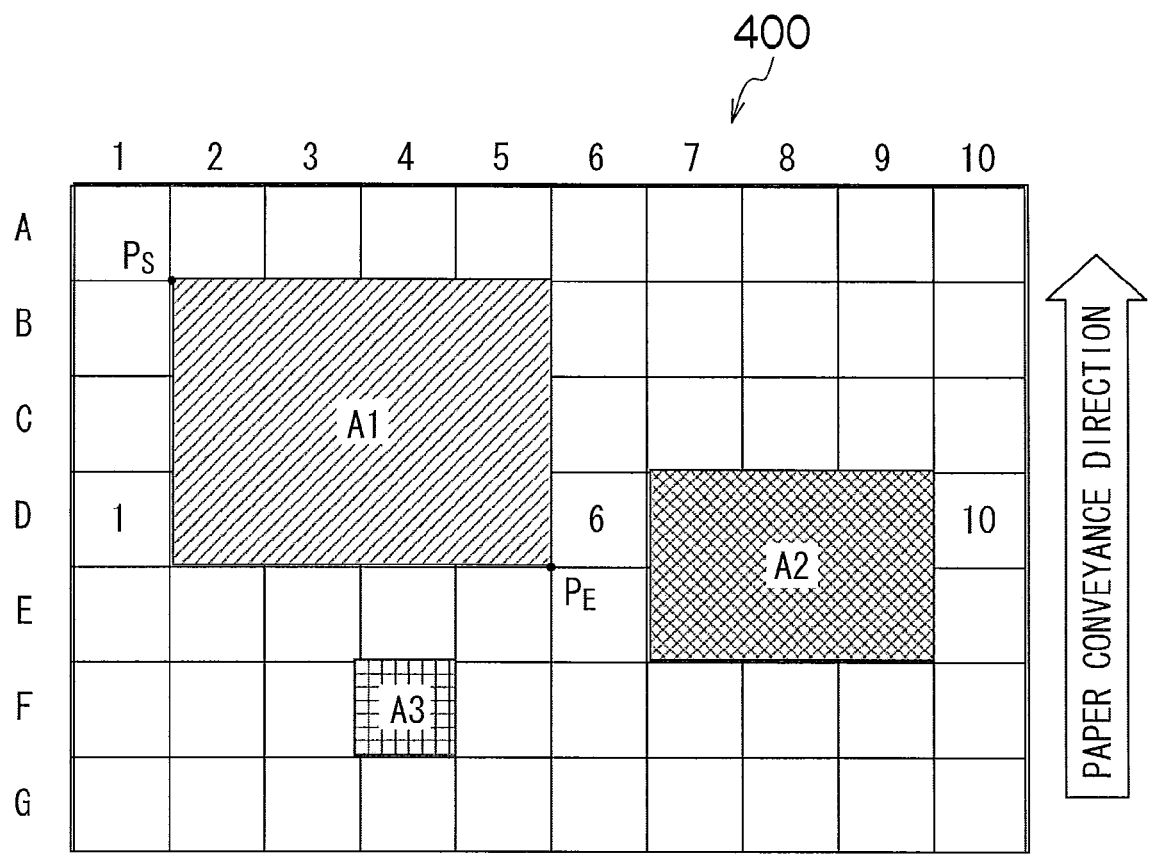
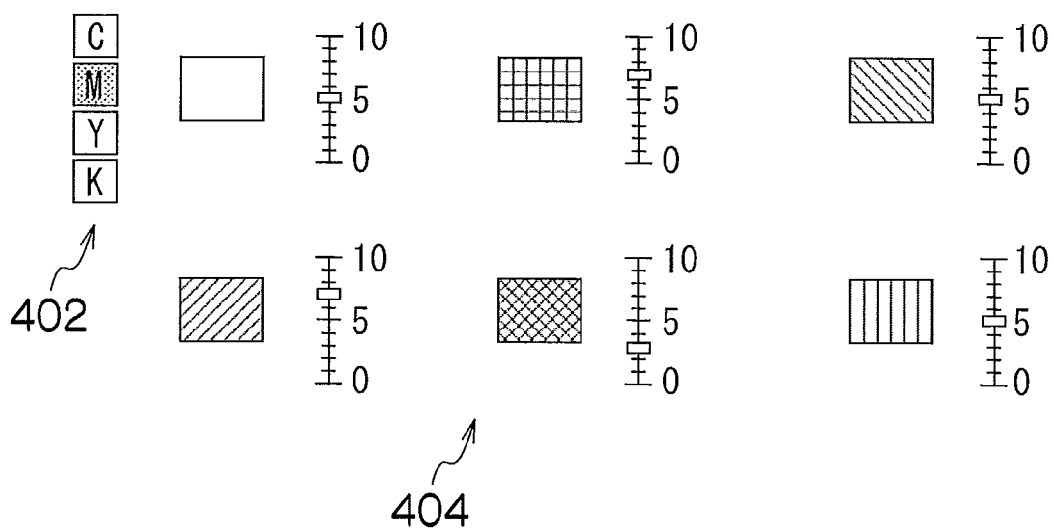

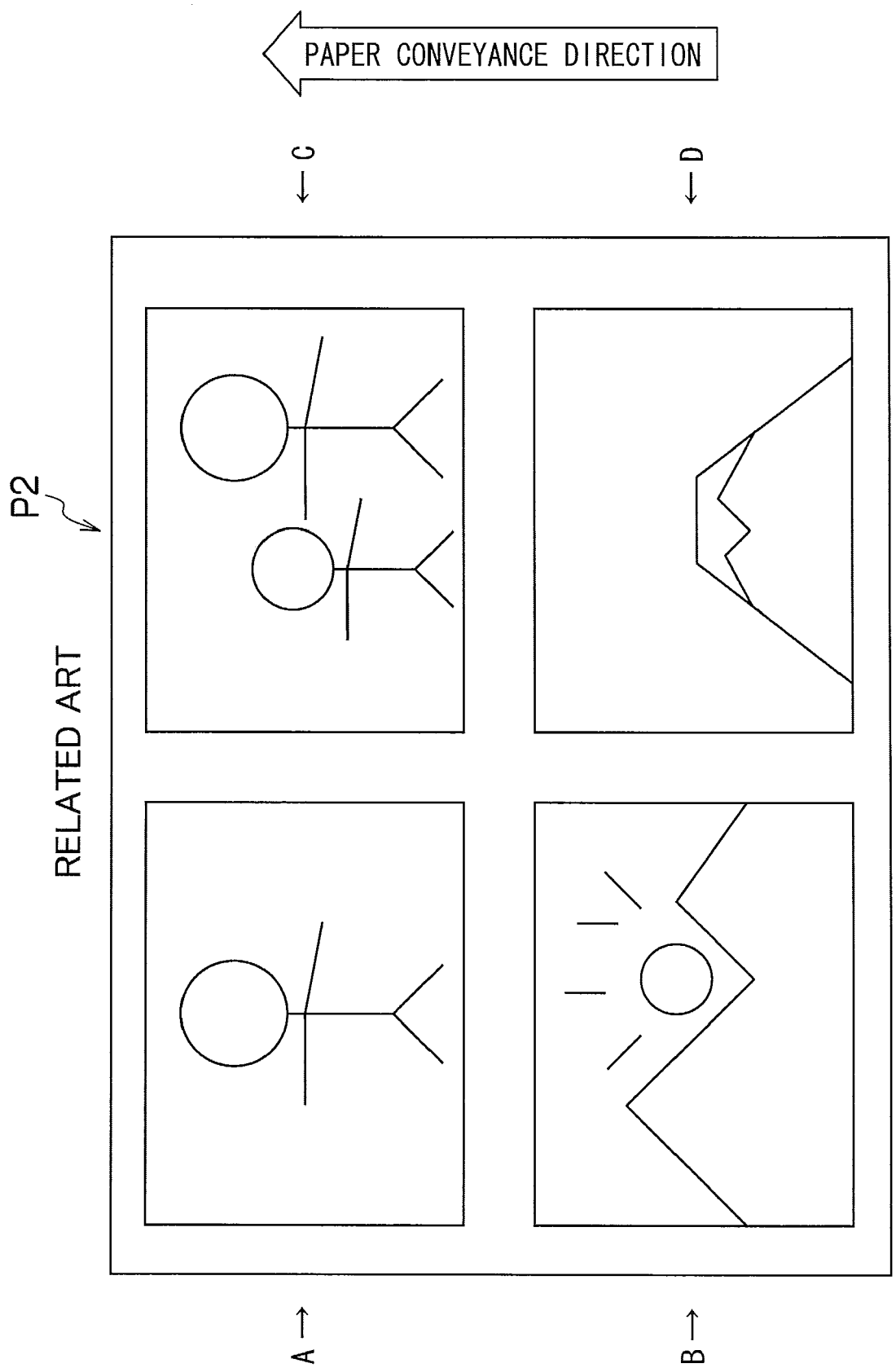

IMAGE FORMING APPARATUS AND METHOD FOR USING SELECTED CORRECTION TABLE BASED ON DIVIDED AREA OF A RECORDING MEDIUM

BACKGROUND OF THE INVENTION

1. Field of the Invention

The present invention relates to an image forming apparatus, an image forming method and a printing apparatus, and more particularly, to an image forming apparatus and an image forming method for creating image data to record onto a recording medium (paper), and to a printing apparatus which prints the image data onto a recording medium.

2. Description of the Related Art

Japanese Patent Application Publication No. 2003-291325 discloses an image recording apparatus employing a line type recording head having a plurality of recording elements configured following a prescribed direction, in which correction data is created for correcting the characteristics (recording divergence, density non-uniformities) of recording elements in two-dimensional positions on a recording medium, and an input image signal supplied to the recording elements in two-dimensional positions is adjusted on the basis of the correction data thus created.

Japanese Patent Application Publication No. 08-123940 discloses an image area extraction apparatus which sets upper and lower threshold values for image parameters on the basis of the average values of image parameters (brightness, luminance, saturation, hue, chromaticity) within a first area that is within a second area specified in an image, and which extracts only those pixels within the second area which have image parameter values in the range designated by the upper and lower threshold values. The technology described in Japanese Patent Application Publication No. 08-123940 performs color correction and tone correction in respect of the area extracted on the basis of the image parameters.

Japanese Patent Application Publication No. 2004-090648 discloses a color control apparatus which controls printing of a polychromatic image by controlling the respective quantities of inks used to print an image on the basis of the respective color densities of the inks determined in a printed image.

In general, in an offset printing apparatus, fine adjustment of color is performed simply by using ink keys in the printing step, as described in Japanese Patent Application Publication No. 2004-090648. If it is not possible to correct colors adequately by means of simple fine adjustment of color in the printing step, then specialized knowledge and complicated work is required in the color correction process and this is difficult to achieve at the level of skill of normal print operators. Therefore, it becomes necessary to return to the plate manufacturing step and carrying out the coloring process again for each image, before manufacturing the printing plate again and carrying out printing.

In a printing system used in commercial printing, it is often the case that the station where the output image data is created (plate manufacturing department) and the station where that image data is actually output (printed) onto a recording medium (hereinafter referred to as "paper") are situated in different locations. For example, there may be a printing system in which a plate manufacturing department situated in a town which is readily accessible to a user requesting a print is connected by high-velocity communications line with a printing department which is situated in a suburb or out-of-town location. Consequently, returning work to the plate manufacturing step in order to perform a color correction process produces a marked decline in the productivity of the printing system. In order to carry out color correction such as that described above in a printing step, it is necessary to provide a high-specification color conversion function in the printing department. Therefore, the costs of the printing apparatuses (printers) in the printing department are increased and the work involved in the printing step becomes complicated.

In the conventional analogue offset printing apparatus, as shown in FIGS. 18 and 19, ink keys ($K_1$, $K_2$, ...) corresponding to respective areas $A_1$, $A_2$, ..., in the direction (hereinafter referred to as "breadthways direction of printing") perpendicular to the direction of conveyance of the paper P1 are provided, and if there is a difference in the finished image when the results of test printing are compared with a desired printed item (proof), then in the printing step the operator of the printing apparatus is able to adjust the density of the respective color plates (for example, a C (Cyan) plate, an M (Magenta) plate, a Y (Yellow) plate and a B (Black) plate), by operating the ink keys corresponding to the areas in the breadthways direction of printing. By adjusting the amount of ink output for each color plate, individually and respectively, as described above, it is possible to absorb differences in conditions in each printing apparatus (environment, differences between individual printing apparatuses, temporal change).

In a digital printing apparatus which uses an electrophotographic method or an inkjet method, the finish is kept more uniform than in an analogue offset printing apparatus, through the use of feedbacks and controls of various types, but as described above, in the printing step, it is necessary to adjust the tone and color reproduction if the results of test printing show a different finish to the desired printed item.

Furthermore, in the conventional offset printing apparatus, it has been possible to adjust the color and tone in each one of areas aligned in the breadthways direction of printing, by adjusting the ink keys provided for the respective colors, but it has not been possible to change the color and tone in respect of areas aligned in the conveyance direction of the paper. For example, as shown in FIG. 20, it is supposed that four A4-size images (A, B, C, D) are arranged on a sheet of paper P2 of half Kiku size (636 mm×469 mm), and that as a result of test printing, there have been the following requests: "reduce red in skin tone of human subjects in image A" and "increase redness of sunset in image B". In this case, in image A, the ink output volume of the M (Magenta) plate is reduced and in image B, the ink output volume of the M plate is increased. However, in the case of the conventional offset printing apparatus, in the printing department it is not possible to perform adjustment which changes the ink output volume in the paper conveyance direction, and therefore the images are returned to the plate manufacturing department and the image faces (A, B, C, D) must be changed or the image data itself must be subjected to halftone conversion processing or color conversion processing again.

SUMMARY OF THE INVENTION

The present invention has been contrived in view of the circumstances such as these, an object thereof being to provide an image forming apparatus, an image forming method and a printing apparatus whereby it is possible to perform correction of image data for printing readily in a printing department, and to adjust image parameters individually in respective areas aligned in the conveyance direction of the paper, which has been difficult to achieve in the conventional offset printing apparatus.

In order to attain the aforementioned object, the present invention is directed to an image forming apparatus, comprising: an area tone setting device which sets an arbitrary tone correction table for each of image forming areas obtained by dividing a recording medium into a plurality of areas; a tone correction table storage device which stores tone correction tables set respectively for the image forming areas by the area tone setting device; an area judgment device which judges the image forming areas on which respective pixels constituting input image data are to be printed; a tone correction table selection device which selects from the tone correction table storage device one of the tone correction tables corresponding to the image forming area judged by the area judgment device; and a tone correction device which performs tone correction of each pixel constituting the input image data, using the tone correction table selected by the tone correction table selection device.

Preferably, the image forming areas are strip-shaped areas divided in parallel to a conveyance direction in which the recording medium is conveyed when an image is formed on the recording medium.

Preferably, the image forming areas are areas divided in a perpendicular direction and a parallel direction with respect to a conveyance direction in which the recording medium is conveyed when an image is formed on the recording medium.

Preferably, the image forming apparatus further comprises an area setting device which sets the image forming areas on the recording medium in accordance with an input from an operator.

Preferably, the tone correction table storage device stores a set of the tone correction tables which gradually change; and the area tone setting device selects one of the tone correction tables to be used for the image forming area in accordance with an input from an operator.

Preferably, the image forming apparatus further comprises a smoothing device which, in a case where a mutually different first and second tone correction tables are selected by the area tone setting device for first and second image forming areas that are mutually adjacent on the recording medium, carries out a smoothing process for gradually changing the tone correction table used in a boundary portion between the first image forming area and the second image forming area from the first tone correction table to the second tone correction table.

Preferably, the image forming apparatus further comprises a density correction table storage device which stores a density correction table for each of nozzles of an inkjet head to be used when recording an image on the recording medium; and a tone correction table synthesis device which synthesizes a synthesized tone table by combining the tone correction table set by the area tone setting device and the density correction table, wherein the tone correction device carries out tone correction for respective pixels constituting the input image data by using the synthesized tone correction table.

In order to attain the aforementioned object, the present invention is also directed to a printing apparatus, comprising: the above-described image forming apparatus; and a printing device which prints an image based on the input image data that has been tone corrected by the image forming apparatus, onto the recording medium, while conveying the recording medium in a prescribed conveyance direction.

In order to attain the aforementioned object, the present invention is also directed to an image forming method, comprising: an area tone setting step of setting an arbitrary tone correction table for each of image forming regions obtained by dividing a recording medium into a plurality of areas; a tone correction table storage step of storing tone correction tables set respectively for the image forming areas in the area tone setting step; an area judgment step of judging the image forming areas on which respective pixels constituting input image data are to be printed; a tone correction table selection step of selecting one of the tone correction tables corresponding to the image forming area judged in the area judgment step from the tone correction tables stored in the tone correction table storage step; and a tone correction step of performing tone correction of each pixel constituting the input image data in use of the tone correction table selected in the tone correction table selection step.

Preferably, the image forming areas are strip-shaped areas divided in parallel to a conveyance direction in which the recording medium is conveyed when an image is formed on the recording medium.

Preferably, the image forming areas are areas divided in a perpendicular direction and a parallel direction with respect to a conveyance direction in which the recording medium is conveyed when an image is formed on the recording medium.

Preferably, the image forming method further comprises an area setting step of setting the image forming areas on the recording medium in accordance with an input from an operator.

Preferably, a set of the tone correction tables which gradually change are stored in the tone correction table storage step; and in the area tone setting step, one of the tone correction tables to be used for the image forming area is selected from the tone correction tables in accordance with an input from an operator.

Preferably, the image forming method further comprises a smoothing step of, in a case where a mutually different first and second tone correction tables are selected in the area tone setting step for first and second image forming areas that are mutually adjacent on the recording medium, carrying out a smoothing process for gradually changing the tone correction table used in a boundary portion between the first image forming area and the second image forming area from the first tone correction table to the second tone correction table.

Preferably, the image forming method further comprises a density correction table storage step of storing a density correction table for each of nozzles of an inkjet head to be used in recording an image on the recording medium; and a tone correction table synthesis step of synthesizing a synthesized tone table by combining the tone correction table set in the area tone setting step and the density correction table, wherein in the tone correction step, tone correction is carried out for respective pixels constituting the input image data by using the synthesized tone correction table.

According to the present invention, by setting a desired tone conversion curve for each of the divided areas on the recording medium and carrying out tone conversion of the image data using this tone conversion curve, it is possible to carry out color and tone conversion, quickly and easily, in the printing department. Furthermore, according to the present embodiment, it is possible to adjust the color using different tone conversion curves for the plurality of image areas arranged in the paper conveyance direction, which could not be adjusted in the conventional offset printing apparatus.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 14 shows a schematic view of a screen for setting tone adjustment in a second embodiment of the present invention;

FIG. 20 is a diagram showing an example of the allocation of image faces.

DETAILED DESCRIPTION OF THE PREFERRED EMBODIMENTS

Structure of Inkjet Recording Apparatus

Figure 1:
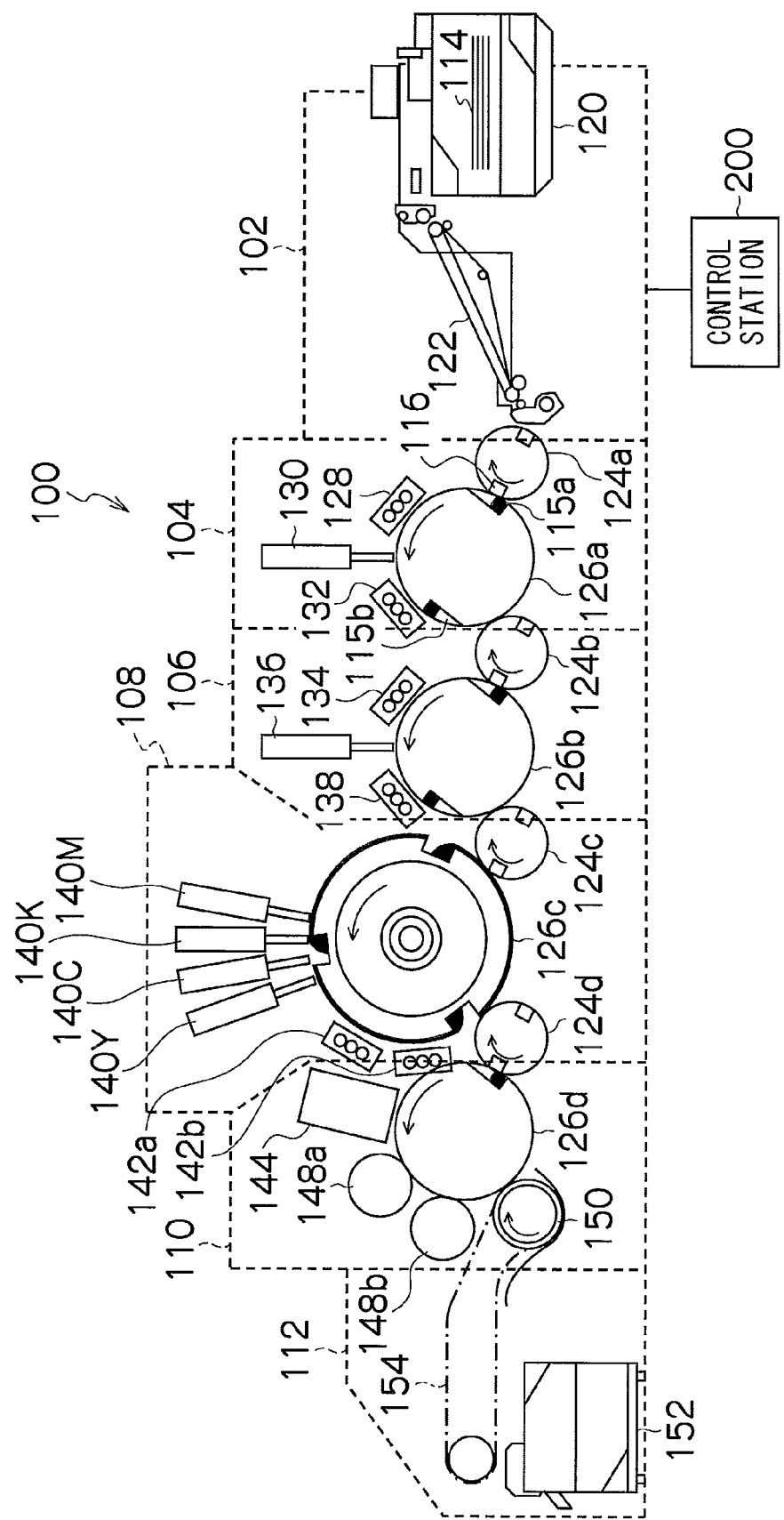
FIG. 1 is a general schematic drawing of an inkjet recording apparatus according to an embodiment of the present invention.

FIG. 1 is a general schematic drawing of the overall composition of an inkjet recording apparatus 100 relating to an embodiment of the present invention. The inkjet recording apparatus 100 illustrated in FIG. 1 is an on demand type image recording apparatus that records desired color images on one side of a sheet (recording medium) 114 by depositing inks of CMYK colors. The inkjet recording apparatus 100 is a recording apparatus that uses the 2 liquid aggregation system that forms images on a recording medium 114 that comprises square paper sheets, using ink and treatment liquid (aggregation treatment liquid). In the present embodiment, Tokubishi art paper (art paper) manufactured by Mitsubishi Paper Mills Limited is used as the recording medium 114, but the present embodiment is not particularly limited to this, and various types of media can be used.

This inkjet recording apparatus 100 principally comprises: a paper supply unit 102 which supplies a recording medium 114; a permeation suppression processing unit 104 which carries out permeation suppression processing on the recording medium 114; a treatment agent deposition unit 106 which deposits treatment agent onto the recording medium 114; an ink to ejection unit 108 which forms an image by depositing colored ink onto the recording medium 114; a fixing treatment unit 110 which carries out a fixing process so that an image recorded on the recording medium 114 is fixed; and a paper output unit 112 which conveys and outputs the recording medium 114 on which an image has been formed. The inkjet recording apparatus 100 is provided with a control station 200 through which an operator at the printing department performs various operations.

A paper supply platform 120 on which recording media 114 is stacked is provided in the paper supply unit 102. A feeder board 122 is connected to the front of the paper supply platform 120 (the left-hand side in FIG. 1), and the recording media 114 stacked on the paper supply platform 120 is supplied one sheet at a time, successively from the uppermost sheet, to the feeder board 122. A recording medium 114 which has been conveyed to the feeder board 122 is supplied via a transfer drum 124a, which is rotatable in the clockwise direction in FIG. 1, to the surface (circumferential surface) of a pressure drum 126a of the permeation suppression processing unit 104.

Grippers (not illustrated) for holding an edge of a recording medium 114 are provided on the transfer drum 124a and pressure drum 126a. When an edge of a recording medium held by a gripper of the transfer drum 124a reaches a place where the recording medium 114 is transferred between the transfer drum 124a and the pressure drum 126a, the edge of the recording medium is transferred from the gripper of the transfer drum 124a to a gripper of the pressure drum 126a. In the present example, two grippers are provided on one pressure drum 126, and one gripper is provided on one transfer drum 124.

<Permeation Suppression Processing Unit>

The permeation suppression processing unit 104 applies permeation suppression agent that suppresses permeation of water and hydrophilic organic solvent contained in the treatment liquid and ink into the recording medium 114. The permeation suppression agent is resin dispersed as an emulsion in a solvent, or a resin dissolved in the solvent. Organic solvent or water is used as the solvent. Methyl ethyl ketone, petroleum, or the like may be desirably used as appropriate as the organic solvent. The temperature $T_1$ of the recording sheet is higher than the lowest film formation temperature $T_{f1}$ of the resin. The difference between $T_1$ and $T_{f1}$ is desirably 10 to 20° C. In this way, a good film is formed immediately after the resin adheres to the recording medium 114, and it is possible to suppress well the permeation into the recording medium 114 of solvents of the inks and treatment liquid which are subsequently applied to the recording medium 114. Adjustment of the temperature of the recording medium 114 may be carried out by the method of providing a heating element such as a heater or the like within the pressure drum 126a, or the method of applying hot air to the surface (top surface) of the recording medium 114, or heating using an infrared heater or the like, or a combination of these.

If the recording medium 114 does not easily curl, the permeation suppression processing unit 104 may be omitted. For example, the quantity of permeation suppression agent applied (including the case where permeation suppression agent is not applied) may be controlled in accordance with the type of recording medium 114.

In the permeation suppression processing unit 104, a paper preheating unit 128, a permeation suppression agent head 130 and a permeation suppression agent drying unit 132 are provided respectively at positions opposing the surface (circumferential surface) of the pressure drum 126a, in this order from the upstream side in terms of the direction of rotation of the pressure drum 126a (the conveyance direction of the recording medium 114; the counter-clockwise direction in FIG. 1).

Heaters which can be temperature-controlled respectively within a prescribed range are provided in the paper preheating unit 128 and the permeation suppression agent drying unit 132. When the recording medium 114 held on the pressure drum 126a passes the positions opposing the paper preheating unit 128 and the permeation suppression agent drying unit 132, it is heated by the heaters of these units.

The permeation suppression agent head 130 ejects droplets of a permeation suppression agent onto a recording medium 114 which is held on the pressure drum 126a and adopts the same composition as the ink heads 140M, 140K, 140C, 140Y of the ink ejection unit 108, which is described below.

In the present embodiment, an inkjet head is used as the device for carrying out permeation suppression processing on the surface of the recording medium 114, but there are no particular restrictions of the device which carries out permeation suppression processing. For example, it is also possible to use various other methods, such as a spray method, application method, and the like.

In the present embodiment, it is desirable to use a thermoplastic resin latex solution as the permeation suppression agent. Of course, the permeation suppression agent is not limited to being a thermoplastic resin latex solution, and for example, it is also possible to use a flat sheet-shaped particles (mica, or the like), or a hydrophobic agent (a fluorine coating agent), or the like.

<Treatment Liquid Deposition Unit>

A treatment liquid deposition unit 106 is provided after the permeation suppression processing unit 104 (to the downstream side of same in terms of the direction of conveyance of the recording medium 114). A transfer drum 124b is provided between the pressure drum 126a of the permeation suppression processing unit 104 and the pressure drum 126b of the treatment liquid deposition unit 106, so as to make contact with same. By adopting this structure, after the recording medium 114 which is held on the pressure drum 126a of the permeation suppression processing unit 104 has been subjected to permeation suppression processing, the recording medium 114 is transferred via the transfer drum 124b, which is rotatable in the clockwise direction in FIG. 1, to the pressure drum 126b of the treatment liquid deposition unit 106.

In the treatment liquid deposition unit 106, a paper preheating unit 134, a treatment liquid head 136 and a treatment liquid drying unit 138 are provided respectively at positions opposing the surface of the pressure drum 126b, in this order from the upstream side in terms of the direction of rotation of the pressure drum 126b (the counter-clockwise direction in FIG. 1).

The respective units of the treatment liquid deposition unit 106 (namely, the paper preheating unit 134, the treatment liquid head 136 and the treatment liquid drying unit 138) use similar compositions to the paper preheating unit 128, the permeation suppression agent head 130 and the permeation suppression agent drying unit 132 of the permeation suppression processing unit 104 which is described above, and the explanation of those units is omitted here. Of course, it is also possible to employ different compositions from the permeation suppression processing unit 104.

The treatment liquid used in the present embodiment is an acidic liquid which has the action of aggregating the coloring material contained in the inks which are ejected onto the recording medium 114 from respective ink heads 140M, 140K, 140C, 140Y provided in the ink ejection unit 108 which is disposed at a downstream stage from the treatment liquid deposition unit 106.

The heating temperature of the heater of the treatment liquid drying unit 138 is set to a temperature at which the treatment liquid which has been deposited onto the surface of the recording medium 114 by the ejection operation of the treatment liquid head 136 disposed to the upstream side in terms of the direction of rotation of the pressure drum 126b is dried, and a solid or semi-solid aggregating treatment agent layer (a thin film layer of dried treatment liquid) is formed on the recording medium 114.

Reference here to "aggregating treatment agent layer in a solid state or a semi-solid state" includes a layer having a moisture content ratio of 0% to 70% as defined below. "Moisture content ratio"="Weight per unit surface area of water contained in treatment liquid after drying $(g/m^2)$"/"Weight per unit surface area of treatment liquid after drying $(g/m^2)$"

Also, "aggregating treatment agent" refers not only to a solid or semi-solid substance, but in addition is used in the broader concept to include a liquid substance. In particular, liquid aggregating treatment agent that includes 70% or more solvent (content rate of solvent) is referred to as "aggregating treatment liquid".

The method of calculating the solvent content of the aggregating treatment agent is to cut out a specific size of sheet (for example 100 mm×100 mm), and to measure the total weight after applying treatment liquid (sheet+treatment liquid before drying) and the total weight after drying the treatment liquid (sheet+treatment liquid after drying). From the difference of these measurements, the amount of reduction in solvent due to drying (quantity of solvent evaporated) is obtained. Also, the calculated quantity obtained from the method of adjusting the treatment liquid may be used as the quantity of solvent contained in the treatment liquid before drying. From these calculation results, the solvent content can be obtained.

Here, the following Table 1 shows the results of evaluation of the movement of color material when the solvent content rate of the treatment liquid (aggregation treatment agent layer) on the recording medium 114 is changed.

TABLE 1

|  | Experiment 1 | Experiment 2 | Experiment 3 | Experiment 4 | Experiment 5 |
|---|---|---|---|---|---|
| Drying process | No | Yes | Yes | Yes | Yes |
| Total weight $(g/m^2)$ | 10.0 | 6.0 | 4.0 | 3.0 | 1.3 |
| Weight of water $(g/m^2)$ | 8.7 | 4.7 | 2.7 | 1.5 | 0 |
| Content rate of solvent (%) | 87 | 78 | 67 | 50 | 0 |
| Movement of coloring material | Poor (Failure) | Average (Dot moves slightly) | Good (Inconspicuous though dot moves) | Excellent | Excellent |

As illustrated in Table 1, if the treatment liquid was not dried (Experiment 1), image degradation due to movement of color material occurred.

In contrast, in cases where the treatment liquid was dried (Experiments 2 to 5), when the treatment liquid was dried until the solvent content in the treatment liquid became 70% or less, movement of color material was not conspicuous. Further, when the treatment liquid was dried until the solvent content in the treatment liquid became 50% or less, the level was so good that movement of color material could not be detected visually. Therefore it has been confirmed that this is effective in preventing image degradation.

In this way, by drying the treatment liquid on the recording medium 114 to a solvent content of 70% or less (desirably 50% or less) so that a solid or semi-solid layer of aggregation treatment agent is formed on the recording medium 114, it is possible to prevent image degradation due to movement of color material.

A desirable mode is one in which the recording medium 114 is preheated by the heater of the paper preheating unit 134, before depositing treatment liquid on the recording medium 114, as in the present embodiment. In this case, it is possible to restrict the heating energy required to dry the treatment liquid to a low level, and therefore energy savings can be made.

An ink ejection unit 108 is provided after the treatment liquid deposition unit 106. A transfer drum 124c, which is composed rotatably in the clockwise direction in FIG. 1, is provided between the pressure drum 126b of the treatment liquid deposition unit 106 and the pressure drum 126c of the ink ejection unit 108, so as to make contact with same. By means of this structure, treatment liquid is deposited onto the recording medium 114 held on the pressure drum 126b of the treatment liquid deposition unit 106, thereby forming a solid or semi-solid layer of aggregating treatment agent, whereupon the recording medium 114 is transferred via the transfer drum 124c to the pressure drum 126c of the ink ejection unit 108.

In the ink ejection unit 108, ink heads 140M, 140K, 140C, 140Y which correspond respectively to four colors of ink, M (magenta), K (black), C (cyan) and Y (yellow), and solution drying units 142a and 142b are provided respectively at positions opposing the surface of the pressure drum 126c, in this order from the upstream side in terms of the direction of rotation of the pressure drum 126c (the counter-clockwise direction in FIG. 1).

The ink heads 140M, 140K, 140C, 140Y employ inkjet type recording heads (inkjet heads), similarly to the permeation suppression agent head 130 and the treatment liquid head 136. In other words, the ink heads 140M, 140K, 140C, 140Y respectively eject droplets of corresponding colored inks onto a recording medium 114 which is held on the pressure drum 126c.

Figure 2:
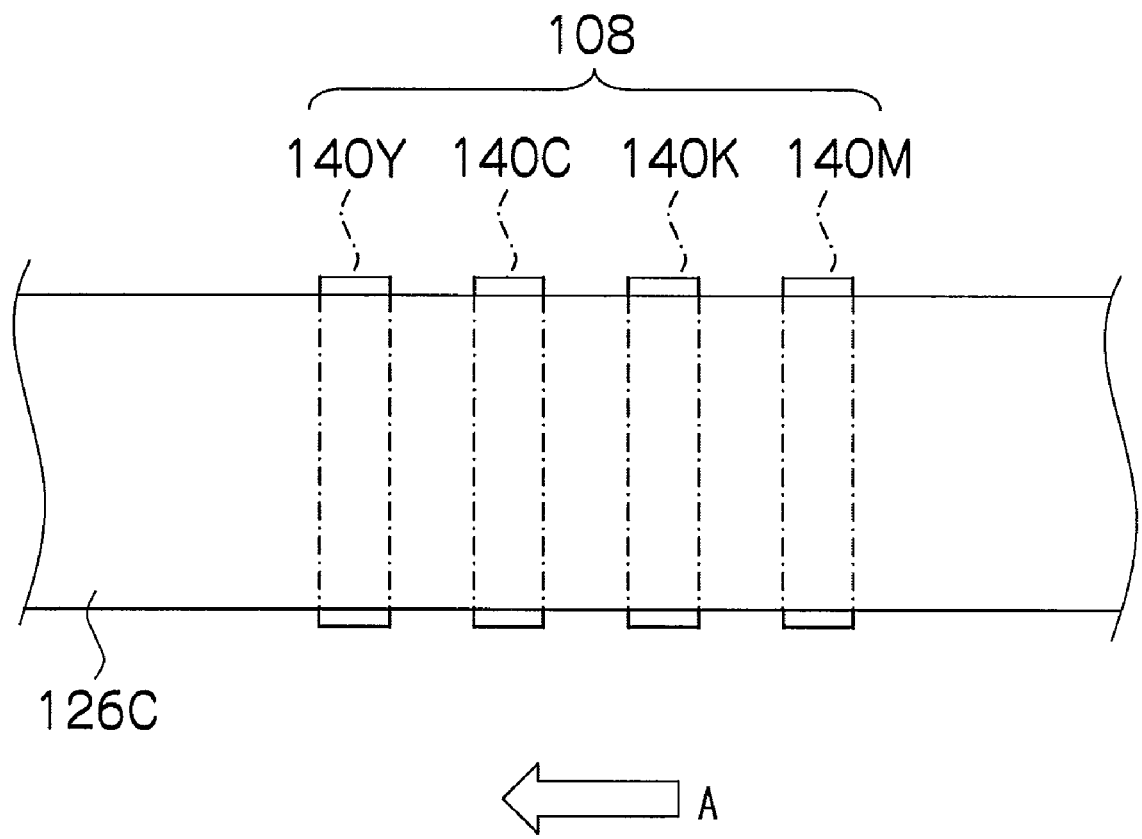
FIG. 2 is a principal plan diagram of the peripheral area of a print unit in the inkjet recording apparatus in FIG. 1.

The ink heads 140M, 140K, 140C, 140Y are each full-line heads having a length corresponding to the maximum width of the image forming region of the recording medium 114 held on the pressure drum 126c, and having a plurality of nozzles for ejecting ink (not illustrated in FIG. 1 and indicated by reference numeral 161 in FIGS. 13A to 13C) arranged through the full width of the image forming region, on the ink ejection surface of the head. The ink heads 140M, 140K, 140C, 140Y are fixed so as to extend in a direction that is perpendicular to the direction of rotation of the pressure drum 126c (the conveyance direction of the recording medium 114) (see FIG. 2).

According to a composition in which such full line heads having nozzle rows which cover the full width of the image forming region of the recording medium 114 are provided for each color of ink, it is possible to record a primary image on the image forming region of the recording medium 114 by performing just one operation of moving the recording medium 114 and the ink heads 140M, 140K, 140C, 140Y relatively with respect to each other (in other words, by one sub-scanning action). Therefore, it is possible to achieve a higher printing speed compared to a case which uses a serial (shuttle) type of head which moves back and forth reciprocally in the direction perpendicular to the conveyance direction of the recording medium 114 (sub-scanning direction), and hence it is possible to improve the print productivity.

Although the configuration with the CMYK four colors is described in the present embodiment, combinations of the ink colors and the number of colors are not limited to those. Light inks, dark inks or special color inks can be added or removed as required. For example, a configuration in which ink heads for ejecting light-colored inks such as light cyan and light magenta are added, or a configuration using the CMYK four colors is possible. Furthermore, there are no particular restrictions of the sequence in which the heads of respective colors are arranged.

The solution drying units 142a and 142b have a composition which comprises heater whose temperature can be controlled within a prescribed range, similarly to the paper preheating units 128 and 134, the permeation suppression agent drying unit 132, and the treatment liquid drying unit 138, which are described above. As described hereinafter, if ink droplets are ejected onto the layer of aggregating treatment agent in a solid state or semi-solid state which has been formed on the recording medium 114, an ink aggregate (coloring material aggregate) is formed on the recording medium 114, and furthermore, the ink solvent which has separated from the coloring material spreads and a liquid layer of dissolved aggregating treatment agent is formed. The solvent component (liquid component) left on the recording medium 114 in this way is a cause of curling of the recording medium 114 and also leads to deterioration of the image. Therefore, in the present embodiment, after ejecting droplets of the corresponding colored inks onto the recording medium 114 respectively from the ink heads is 140M, 140K, 140C, 140Y, heating is carried out by the heaters of the solution drying units 142a and 142b, and the solvent component is evaporated off and dried.

<Fixing Processing Unit>

The fixing processing unit 110 is provided subsequent to the ink ejection unit 108, and a transfer drum 124d is provided between the pressure drum 126c of the ink ejection unit 108 and the pressure drum 126d of the fixing processing unit 110 so as to make contact with the pressure drums. By this means, after the respective colored inks have been deposited on the recording medium 114 which is held on the pressure drum 126c of the ink ejection unit 108, the recording medium 114 is transferred via the transfer drum 124d to the pressure drum 126d of the fixing processing unit 110.

In the fixing processing unit 110, an in-line sensor 144 which reads in the print results of the ink ejection unit 108, and heating rollers 148a and 148b are provided respectively at positions opposing the surface of the pressure drum 126d, in this order from the upstream side in terms of the direction of rotation of the pressure drum 126d (the counter-clockwise direction in FIG. 1).

In the present embodiment, a mode based on application of heat and pressure is described as one example of a fixing device after image recording, but it is also possible to adopt other compositions, such as a composition in which a transparent ultraviolet-curable ink droplet ejection unit ejects droplets of transparent ultraviolet-curable ink, and the transparent ultraviolet-curable ink is cured and the image is thereby fixed onto the recording medium 114 by irradiating ultraviolet light thereon.

The in-line sensor 144 is a device for reading an output image, and includes an image sensor (a line sensor, or the like) which captures the print result of the ink ejection unit 108 (the droplet ejection results of the respective ink heads 140M, 140K, 140C, 140Y). The in-line sensor 144 functions as a device for checking for nozzle blockages and other ejection defects on the basis of the droplet ejection image read out by the image sensor, and functions as a colorimetrical device for acquiring color information.

In the present example, a test pattern is formed on the image recording region or the non-image portion of the recording medium 114, the test pattern is read in by the in-line sensor 144, and in-line determination is carried out so as to acquire the color information (colorimetry), determine the density variability and determine the presence or absence of ejection abnormalities in the respective nozzles, on the basis of the reading results.

The in-line sensor (ILS) 144 employed in the present example comprises a line CCD in which a plurality of inspection pixels (photoelectric conversion element) are arranged in one row or a plurality of rows in the breadthways direction of the recording medium 114 (or an area sensor in which a plurality of inspection pixels are arranged in a two-dimensional configuration), and a lens (reducing grass) disposed in such a manner that the line CCD (or area sensor) can read in the whole of the breadthways direction of the recording medium 114 at the same time. Instead of the above line sensor having a determination range which can read the data in terms of the recordable width at the same time, it is possible to use a sensor having a readable range narrower than the above line sensor. In such a mode, the data reading can be carried out while moving (scanning) the reading position.

<Paper Output Unit>

The paper output unit 112 is provided subsequent to the fixing processing unit 110. In the paper output unit 112, there are provided: a paper output drum 150 which receives a recording medium 114 subjected to fixing processing, a paper output platform 152 on which recording media 114 is stacked, and a paper output chain 154 comprising a plurality of paper output grippers, which are spanned between a sprocket provided on the paper output drum 150 and a sprocket provided above the paper output platform 152.

<Structural Example of Head>

Next, the structure of the ink heads 140M, 140K, 140C, 140Y disposed in the ink ejection unit 108 will be described in detail. The ink heads 140M, 140K, 140C, 140Y have a common structure, and therefore, below, these heads are represented by an ink head (hereinafter, simply called a "head") which is indicated by reference numeral 160.

Figure 3A:
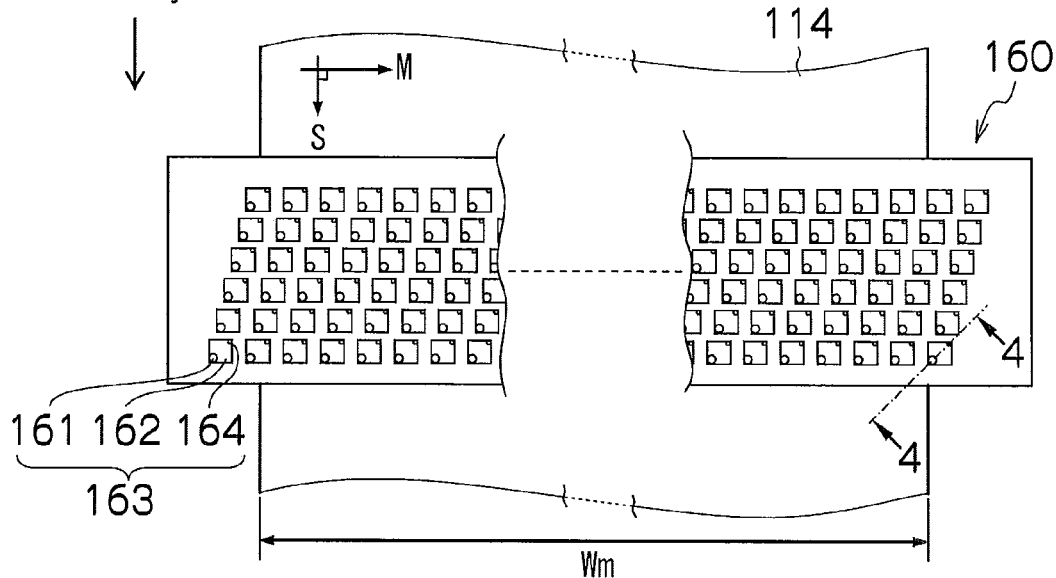
FIGS. 3A to 3C are plan view perspective diagrams illustrating examples of the head in FIG. 1.
Figure 3B:
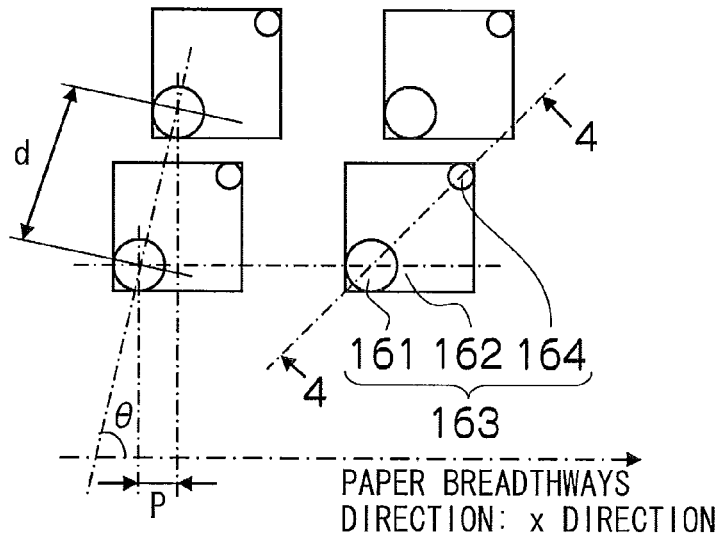
Figure 3C:
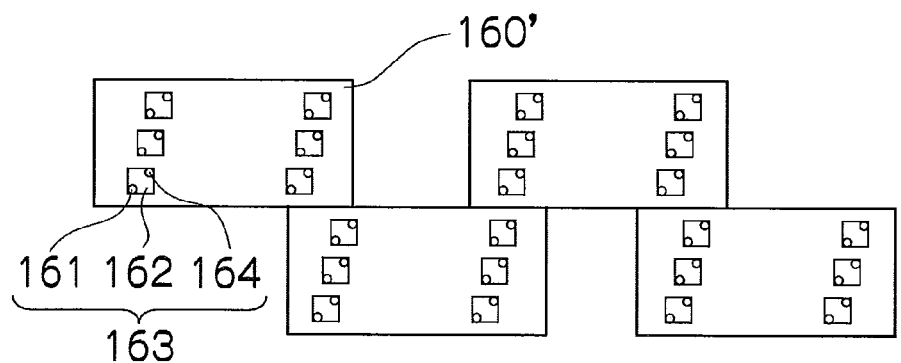
Figure 4:
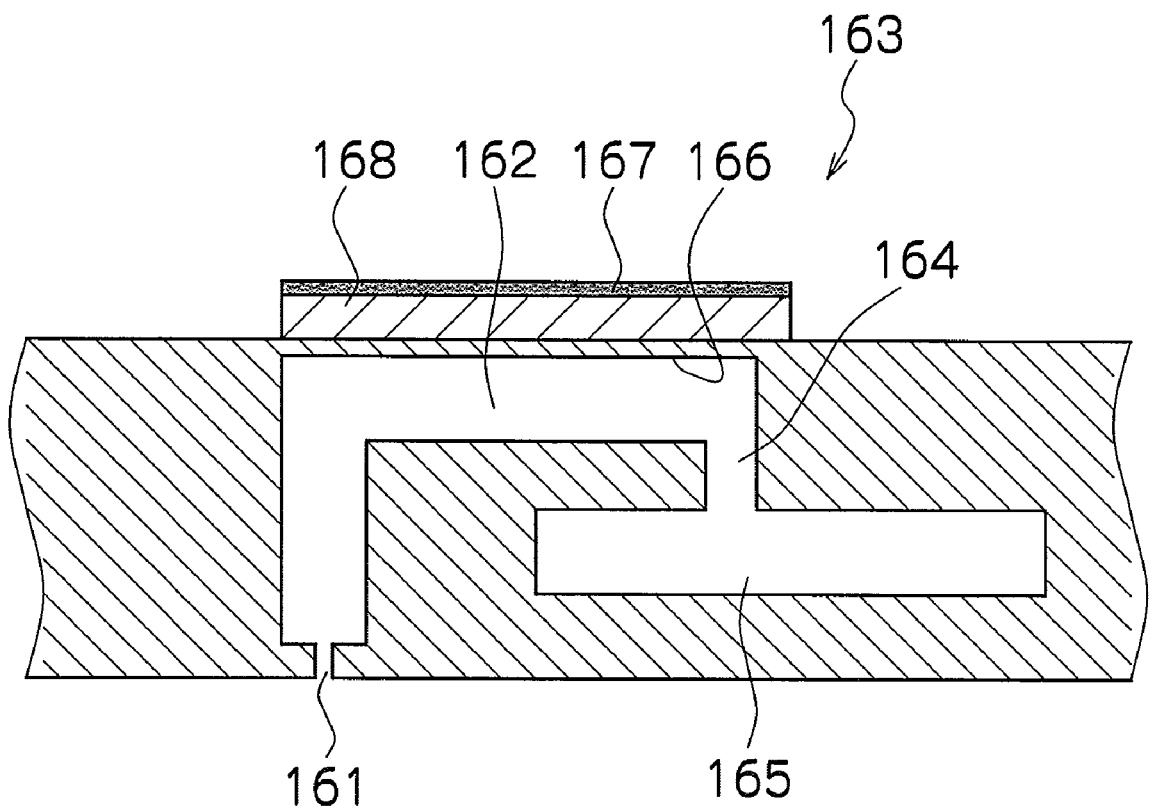
FIG. 4 is a cross-sectional diagram along line 4-4 in FIGS. 3A and 3B.

FIG. 3A is a perspective plan view illustrating an example of the configuration of a head 160, FIG. 3B is an enlarged view of a portion thereof FIG. 3C is a perspective plan view illustrating another example of the configuration of the head 160. FIG. 4 is a cross-sectional view taken along line 4-4 in FIGS. 3A and 3B, illustrating the cross sectional view structure of a liquid ejection element for one channel forming a recording element unit (an ink chamber unit corresponding to one nozzle 161).

The nozzle pitch in the head 160 should be minimized in order to maximize the density of the dots formed on the surface of the recording medium 114. As illustrated in FIGS. 3A and 3B, the head 160 according to the present embodiment has a structure in which a plurality of ink chamber units 163, each comprising a nozzle 161 forming an ink droplet ejection port, a pressure chamber 162 corresponding to the nozzle 161, and the like, are disposed two-dimensionally in the form of a staggered matrix, and hence the effective nozzle interval (the projected nozzle pitch) as projected in the lengthwise direction of the head (the main-scanning direction perpendicular to the recording medium conveyance direction) is reduced and high nozzle density is achieved.

The mode of forming one or more nozzle rows through a length corresponding to the entire width of the recording medium 114 in a direction substantially perpendicular to the conveyance direction of the recording medium 114 is not limited to the example described above. For example, instead of the configuration in FIG. 3A, as illustrated in FIG. 3C, a line head having nozzle rows of a length corresponding to the entire width of the recording medium 114 can be formed by arranging and combining, in a staggered matrix, short head blocks 160' having a plurality of nozzles 161 arrayed in a two-dimensional fashion. Furthermore, although not illustrated in the drawings, it is also possible to compose a line head by arranging short heads in one row.

The planar shape of the pressure chamber 162 provided for each nozzle 161 is substantially a square, and the nozzle 161 and supply port 164 are disposed in both corners on a diagonal line of the square. Each pressure chamber 162 is connected to a common channel 165 through the supply port 164. The common channel 165 is connected to an ink supplied tank (not illustrated), which is a base tank that supplies ink, and the ink supplied from the ink supplied tank is delivered through the common flow channel 165 to the pressure chambers 162.

A piezoelectric element 168 provided with an individual electrode 167 is bonded to a pressure plate 166 (a diaphragm that also serves as a common electrode) which forms a portion of the surfaces of each pressure chamber 162 (in FIG. 4, the ceiling thereof). When a drive voltage is applied to the individual electrode 167, the piezoelectric element 168 is deformed and the ink is thereby ejected through the nozzle 161. When ink is ejected, new ink is supplied to the pressure chamber 162 from the common flow channel 165 through the supply port 164.

In the present example, a piezoelectric element 168 is used as an ink ejection force generating device which causes ink to be ejected from a nozzle 160 provided in a head 161, but it is also possible to employ a thermal method in which a heater is provided inside each pressure chamber 162 and ink is ejected by using the pressure of the film boiling action caused by the heating action of this heater.

Figure 5:
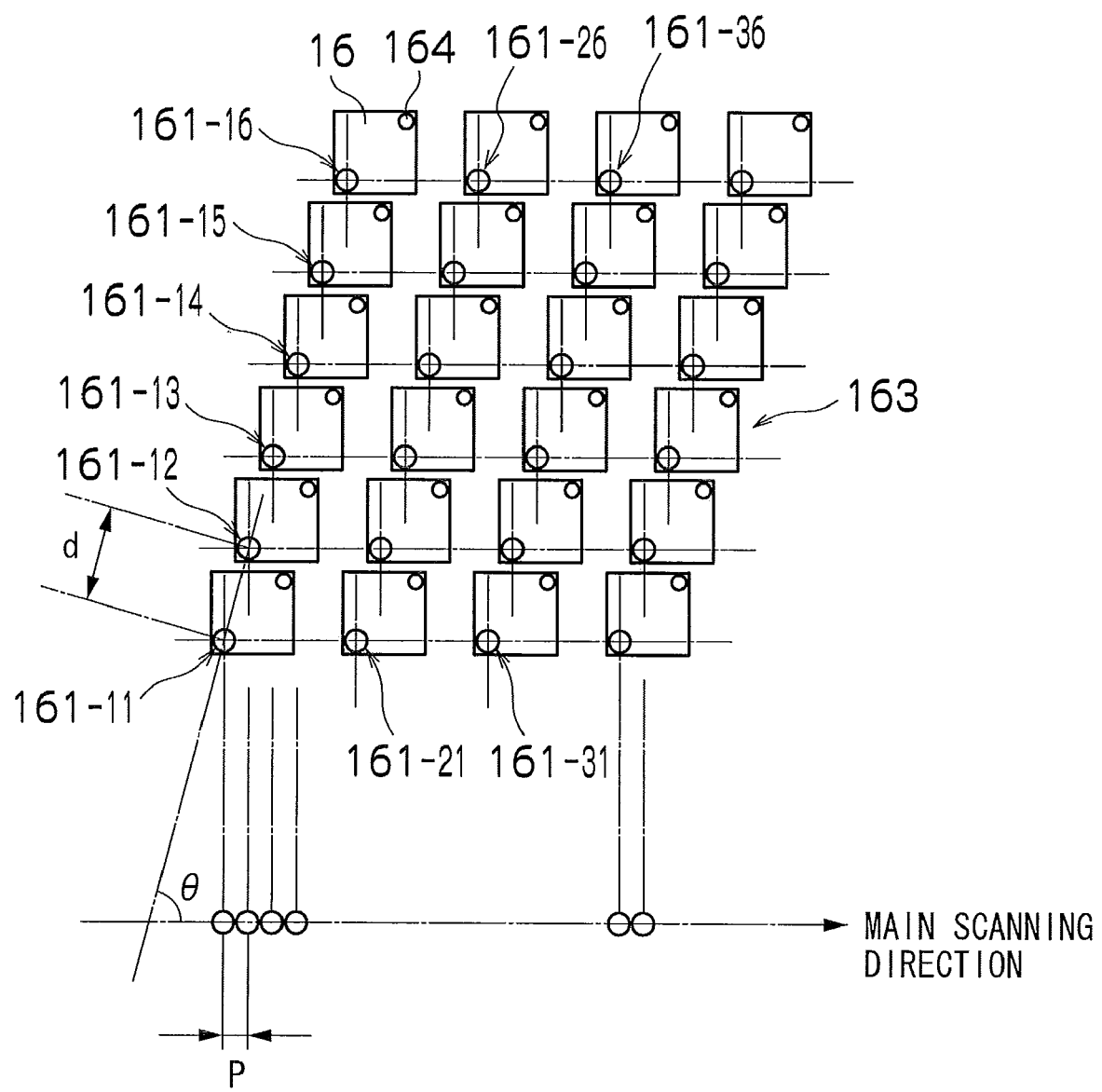
FIG. 5 is an enlarged view illustrating a nozzle arrangement in the print head in FIG. 3A.

As illustrated in FIG. 5, the high-density nozzle head according to the present embodiment is achieved by arranging a plurality of ink chamber units 163 having the above-described structure in a lattice fashion based on a fixed arrangement pattern, in a row direction which coincides with the main scanning direction, and a column direction which is inclined at a fixed angle of $\theta$ with respect to the main scanning direction, rather than being perpendicular to the main scanning direction.

More specifically, by adopting a structure in which a plurality of ink chamber units 163 are arranged at a uniform pitch d in line with a direction forming an angle of $\theta$ with respect to the main scanning direction, the pitch P of the nozzles projected so as to align in the main scanning direction is $d \times \cos \theta$, and hence the nozzles 161 can be regarded to be equivalent to those arranged linearly at a fixed pitch P along the main scanning direction.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording medium 114 (the direction perpendicular to the conveyance direction of the recording medium 114) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 161 arranged in a matrix such as that illustrated in FIGS. 3A and 3B are driven, the main scanning according to the above-described (3) is preferred. More specifically, the nozzles 161-11, 161-12, 161-13, 161-14, 161-15 and 161-16 are treated as a block (additionally; the nozzles 161-21, 161-22, . . . , 161-26 are treated as another block; the nozzles 161-31, 161-32, . . . , 161-36 are treated as another block; . . . ); and one line is printed in the width direction of the recording medium 114 by sequentially driving the nozzles 161-11, 161-12, . . . , 161-16 in accordance with the conveyance velocity of the recording medium 114.

On the other hand, "sub-scanning" is defined as to repeatedly perform printing of one line (a line formed of a row of dots, or a line formed of a plurality of rows of dots) formed by the main scanning, while moving the full-line head and the recording medium 114 relatively to each other.

The direction indicated by one line (or the lengthwise direction of the band-shaped region thus recorded) recorded by the main scanning action is called the "main scanning direction", and the direction in which sub-scanning is performed is called the sub-scanning direction. Consequently, the conveyance direction of the recording medium 114 is the sub-scanning direction and the width direction of the recording medium 114 being perpendicular to the sub-scanning direction is called the main scanning direction. The arrangement of the nozzles of embodiments of the present invention is not limited to the arrangements illustrated in the drawings. Various nozzle arrangements, such as an arrangement of one nozzle row in the sub-scanning direction for example, can be employed.

Furthermore, the scope of application of the present invention is not limited to a printing system based on a line type of head, and it is also possible to adopt a serial system where a short head which is shorter than the breadthways dimension of the recording medium 114 is scanned (moved) in the breadthways direction (main scanning direction) of the recording medium 114, thereby performing printing in the breadthways direction, and when one printing action in the breadthways direction has been completed, the recording medium 114 is moved through a prescribed amount in the direction perpendicular to the breadthways direction (the sub-scanning direction), printing in the breadthways direction of the recording medium 114 is carried out in the next printing region, and by repeating this sequence, printing is performed over the whole surface of the printing region of the recording medium 114.

Figure 6:
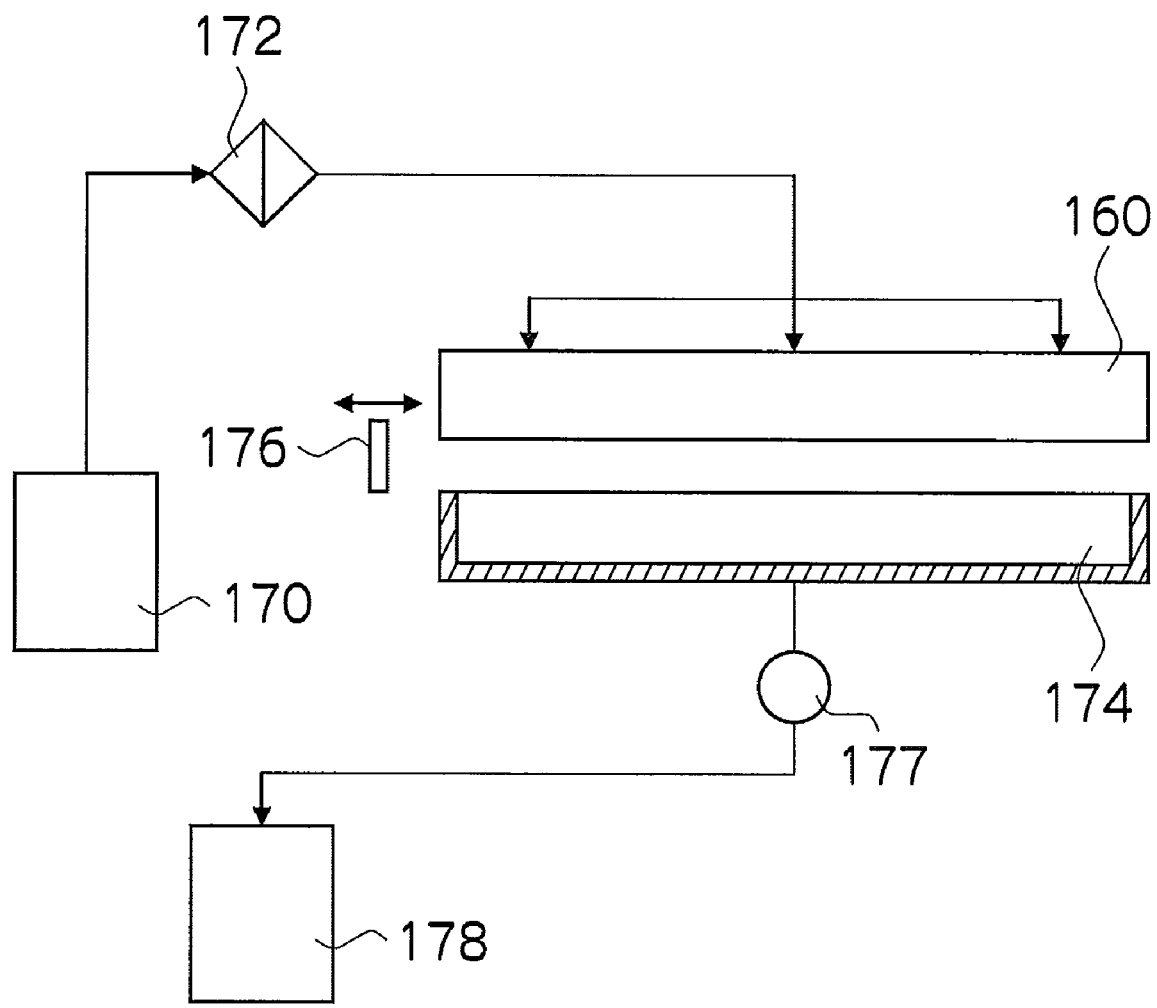
FIG. 6 is a schematic drawing illustrating the composition of an ink supply system.

FIG. 6 is a schematic drawing illustrating the configuration of the ink supply system in the inkjet recording apparatus 100. The ink supply tank 170 is a base tank to supply ink to the print head 160 and is included in the ink storing and loading unit described above. The aspects of the ink supply tank 170 include a refillable type and a cartridge type: when the remaining amount of ink is low, the ink tank of the refillable type is filled with ink through a filling port (not illustrated) and the ink tank of the cartridge type is replaced with a new one. In order to change the ink type in accordance with the intended application, the cartridge type is suitable, and it is desirable to represent the ink type information with a bar code or the like, and to perform ejection control in accordance with the ink type.

A filter 172 for removing foreign matters and bubbles is disposed in the middle of the channel connecting the ink supply tank 170 and the print head 160 as illustrated in FIG. 6. The filter mesh size in the filter 62 is desirably equivalent to or not more than the diameter of the nozzle of print head and commonly about 20 μm.

Although not illustrated in FIG. 6, it is desirable to provide a sub-tank integrally to the print head 160 or nearby the print head 160. The sub-tank has a damper function for preventing variation in the internal pressure of the head and a function for improving refilling of the print head.

The inkjet recording apparatus 100 is also provided with a cap 174 as a device to prevent the nozzles from drying out or to prevent an increase in the ink viscosity in the vicinity of the nozzles, and a cleaning blade 176 as a device to clean the ink ejection surface of the head 160.

A maintenance unit including the cap 174 and the cleaning blade 176 can be relatively moved with respect to the print head 160 by a movement mechanism (not illustrated), and is moved from a place for recording to a place above the maintenance unit as required.

The cap 174 is displaced up and down relatively with respect to the print head 160 by an elevator mechanism (not illustrated). When the power of the inkjet recording apparatus 100 is turned OFF or when the apparatus 100 is in a standby state for printing, the elevator mechanism raises the cap 174 to a predetermined elevated position so as to come into close contact with the print head 160, and the nozzle region of the nozzle surface 50A is thereby covered by the cap 174.

During printing or during standby, if the use frequency of a particular nozzle 161 has declined and the non-ejection of the ink continues for over a certain time, then the ink solvent in the vicinity of nozzles evaporates off and thereby the ink viscosity in the vicinity of the nozzle has increased. Once the ink reaches the state of this kind, it is difficult to eject the ink from the nozzles 161 even if the piezoelectric elements 168 operate.

Therefore, before a situation of this kind develops (namely, while the ink is within a range of viscosity which allows it to be ejected by operation of a piezoelectric element 168), the piezoelectric element 168 is operated, and a preliminary ejection ("purge", "blank ejection", "liquid ejection" or "dummy ejection") is carried out toward the cap 174 (ink receptacle), in order to expel the degraded ink (namely, the ink in the vicinity of the nozzle which has increased viscosity).

Furthermore, if air bubbles enter into the ink inside the head 160 (inside the pressure chamber 162), then even if the piezoelectric element 168 is operated, it may not be possible to eject ink from the nozzle. In a case of this kind, the cap 174 is placed on the head 160, the ink (ink containing air bubbles) inside the pressure chamber 162 is removed by suction, by means of a suction pump 177, and the ink removed by suction is then supplied to a recovery tank 178.

This suction operation is also carried out in order to remove degraded ink having increased viscosity (hardened ink), when ink is loaded into the head for the first time, and when the head starts to be used after having been out of use for a long period of time. Since the suction operation is carried out with respect to all of the ink inside the pressure chamber 162, the ink consumption is considerably large. Therefore, a mode in which preliminary ejection is carried out when the increase in the viscosity of the ink is still minor, is desirable.

The cleaning blade 176 is composed of rubber or another elastic member, and can slide on the ink ejection surface of the print head 160 by means of a blade movement mechanism (not illustrated). When ink droplets or foreign matter has adhered to the ink ejection surface, the ink ejection surface is wiped and cleaned by sliding the cleaning blade 176 on the ink ejection surface.

The inkjet recording apparatus 100 according to the present embodiment is provided in such a manner a nozzle having an ejection abnormality is judged from the read results of the in-line sensor 144 (see FIG. 1) and this judged ejection abnormality nozzle is subject to the recovery treatment. The recovery treatment according to the present embodiment includes the preliminary ejection and suction described above.

<Description of Control System>

Figure 7:
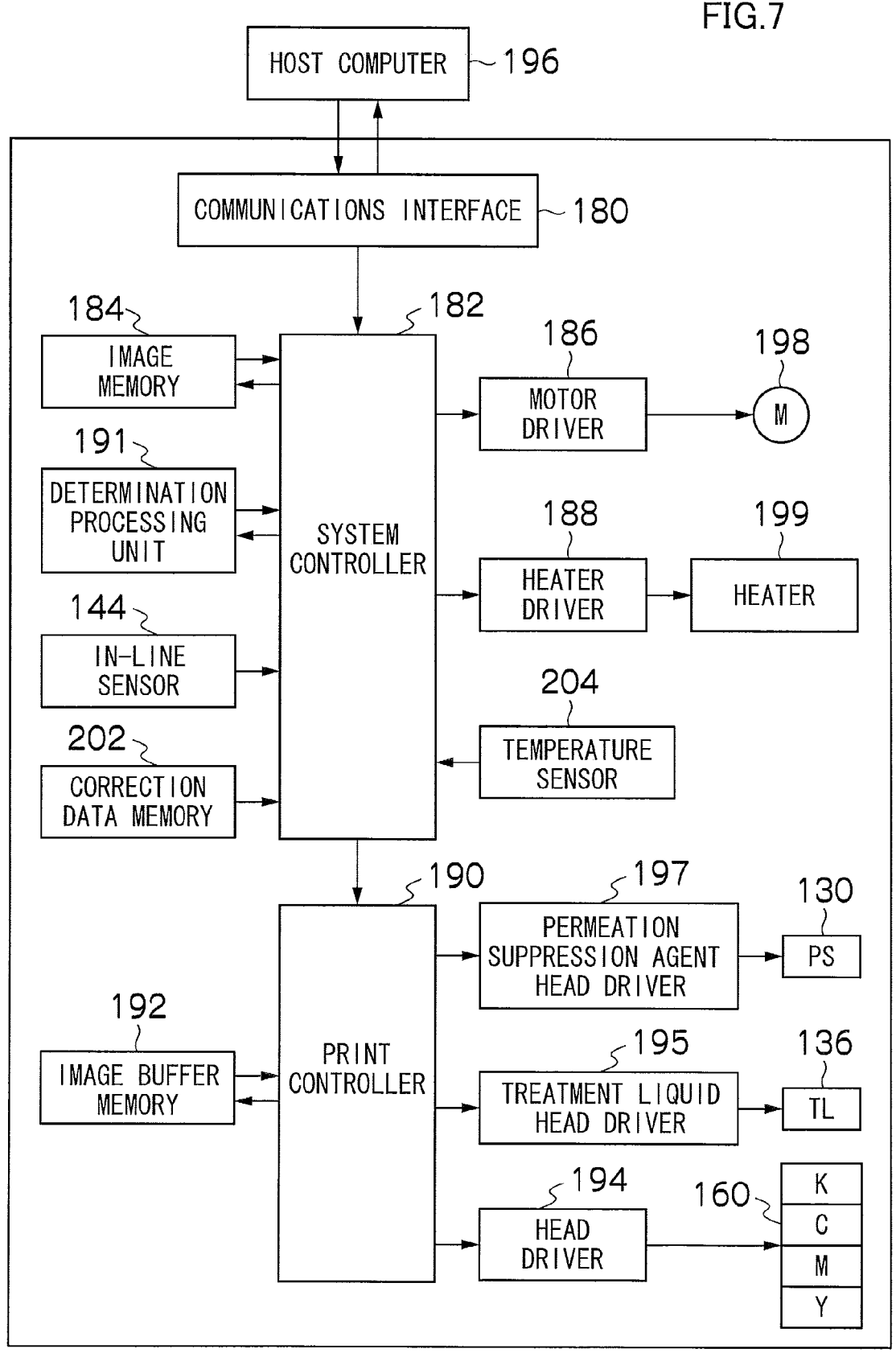
FIG. 7 is a principal block diagram illustrating a system configuration of the inkjet recording apparatus in FIG. 1.

FIG. 7 is a principal block diagram illustrating the system configuration of the inkjet recording apparatus 100. The inkjet recording apparatus 100 comprises a communications interface 180, a system controller 182, an image memory 184, a motor driver 186, a heater driver 188, a print controller 190, an image buffer memory 192, a head driver 194, and the like.

The communications interface 180 is an interface unit for receiving image data sent from a host computer 196. A serial interface such as USB (Universal Serial Bus), IEEE1394, Ethernet, wireless network, or a parallel interface such as a Centronics interface may be used as the communications interface 180. A buffer memory (not illustrated) may be mounted in this portion in order to increase the communication speed. The image data sent from the host computer 196 is received by the inkjet recording apparatus 100 through the communications interface 180, and is temporarily stored in the image memory 184.

The image memory 184 is a storage device for temporarily storing images inputted through the communications interface 180, and data is written and read to and from the image memory 184 through the system controller 182. The image memory 184 is not limited to a memory composed of semiconductor elements, and a hard disk drive or another magnetic medium may be used.

The system controller 182 is constituted by a central processing unit (CPU) and peripheral circuits thereof, and the like, and it functions as a control device for controlling the whole of the inkjet recording apparatus 100 in accordance with prescribed programs, as well as a calculation device for performing various calculations. More specifically, the system controller 182 controls the various sections, such as the communications interface 180, image memory 184, motor driver 186, heater driver 188, and the like, as well as controlling communications with the host computer 196 and writing and reading to and from the image memory 184, and it also generates control signals for controlling the motor 198 of the conveyance system and the heater 199.

Programs executed by the CPU of the system controller 182 and the various types of data which are required for control procedures are stored in the image memory 184. The image memory 184 may be a non-writeable storage device, or it may be a rewriteable storage device, such as an EEPROM. The image memory 184 is used as a temporary storage region for the image data, and it is also used as a program development region and a calculation work region for the CPU.

Various control programs are stored in the program storage unit (not illustrated), and a control program is read out and executed in accordance with commands from the system controller 182. The program storage unit may use a semiconductor memory, such as a ROM, EEPROM, or a magnetic disk, or the like. An external interface may be provided, and a memory card or PC card may also be used. Naturally, a plurality of these recording media may also be provided. The program storage unit may also be combined with a storage device for storing operational parameters, and the like.

The motor driver 186 is a driver which drives the motor 198 in accordance with instructions from the system controller 182. In FIG. 7, the motors (actuators) disposed in the respective sections of the apparatus are represented by the reference numeral 198. For example, the motor 198 illustrated in FIG. 7 includes motors which drive the pressure drums 126a to 126d in FIG. 1, the transfer drums 124a to 124d and the paper output drum 150.

The heater driver 188 is a driver which drives the heater 199 in accordance with instructions from the system controller 182. In FIG. 7, the plurality of heaters which are provided in the inkjet recording apparatus 100 are represented by the reference numeral 199. For example, the heater 199 illustrated in FIG. 7 includes the heaters of the paper preheating units 128 and 134 illustrated in FIG. 1, the permeation suppression agent drying unit 132, the treatment liquid drying unit 138, the solvent drying unit 142a and 142b, the heating rollers 148a and 148b, and the like.

The print controller 190 has a signal processing function for performing various tasks, compensations, and other types of processing for generating print control signals from the image data stored in the image memory 184 in accordance with commands from the system controller 182 so as to supply the generated print data (dot data) to the head driver 194, a permeation suppression agent head driver 197 and a treatment liquid head driver 195. Required signal processing is carried out in the print controller 190, and the ejection amount and the ejection timing of the ink droplets from the respective print heads 160 are controlled via the head driver 194, on the basis of the print data. By this means, desired dot size and dot positions can be achieved. Further, on the basis of the image data, the deposition volume and deposition timing of the permeation suppression agent of the permeation suppression agent head 130 are controlled via the permeation suppression agent head driver 197, and the deposition volume and deposition timing of the treatment liquid of the treatment liquid head 136 are controlled via the treatment liquid head driver 195.

The print controller 190 is provided with the image buffer memory 192; and image data, parameters, and other data are temporarily stored in the image buffer memory 192 when image data is processed in the print controller 190. Also possible is an aspect in which the print controller 190 and the system controller 182 are integrated to form a single processor.

The head driver 194 generates drive signals to be applied to the piezoelectric elements 168 of the head 160, on the basis of image data supplied from the print controller 190, and also comprises drive circuits which drive the piezoelectric elements 168 by applying the drive signals to the piezoelectric elements 168. A feedback control system for maintaining constant drive conditions in the head 160 may be included in the head driver 194 illustrated in FIG. 7.

The in-line sensor 144 is a block that includes the CCD line sensor as described above with reference to FIG. 1, reads the image printed on the recording medium 114, determines the print conditions (color, density, presence of the ejection, variation in the dot formation, and the like) by performing required signal processing, and the like, and provides the determination results of the print conditions to the determination processing unit 191 via the system controller 182.

The determination processing unit 191 performs the computation of the color measurement (colorimetry) and the density, and the like. Further, this determination processing unit 191 judges a nozzle suffering ejection abnormality on the basis of information obtained from the in-line sensor 144, and if the ejection abnormality can be corrected by means of image correction, sends control signals to the respective sections via the system controller 182 so as to perform image correction. Furthermore, if it is not possible to remedy the abnormality by means of image correction, then control signals are sent to the respective units via the system controller 182 in such a manner that preliminary ejection or suctioning is carried out in respect of the nozzle or nozzles suffering ejection abnormality.

In other words, the determination processing unit 191 functions as a control unit for in-line inspection which is carried out in the inkjet recording apparatus 100 illustrated in the present example. A mode is also possible in which the determination processing unit 191 is formed as a functional block which is built into the system controller 182 or print controller 190.

Further, the present apparatus includes a correction data memory 202 as a storage device that stores correction data such as arithmetic expressions used for corresponding to the conversion equations used for higher-order color correction, and conversion tables, and the like, and a temperature sensor 204 as a device for obtaining temperature information used in temperature correction. The correction data stored in the correction data memory 202 is defined based on tests for each ink type, sheet type, and treatment liquid type. The correction data to be applied is selected in accordance with the combination of ink type, sheet type, and treatment liquid type used. Also, it is possible to add, amend, and update, and so on, the correction data in the correction data memory 202. Therefore it is possible to deal with new ink types, sheet types, and treatment liquid types, and so on, by updating the correction data at any time.

The temperature sensor 204 measures either directly or indirectly the temperature of the recording medium 114 in the ink ejection unit 108 as explained in FIG. 1. For example, the temperature sensor 204 is disposed in a specific location to measure the surface temperature of the pressure drum 126c serving as a medium supporting device for supporting the recording medium 114 in the ink ejection unit 108.

<Printing Operation by Inkjet Recording Apparatus>

Next, actions of the inkjet recording apparatus having the above-described structure are described.

The recording medium 114 is conveyed to the feeder board 122 from the paper supply platform 120 of the paper supply unit 102. The recording medium 114 is held on the pressure drum 126a of the permeation suppression processing unit 104, via the transfer drum 124a, and is preheated by the paper preheating unit 128, and droplets of permeation suppression agent are ejected by the permeation suppression agent head 130. Thereupon, the recording medium 114 which is held on the pressure drum 126a is heated by the permeation suppression agent drying unit 132, and the solvent component (liquid component) of the permeation suppression agent is evaporated and dried.

The recording medium 114 which has been subjected to permeation suppression processing in this way is transferred from the pressure drum 126a of the permeation suppression processing unit 104 via the transfer drum 124b to the pressure drum 126b of the treatment liquid deposition unit 106. The recording medium 114 which is held on the pressure drum 126b is preheated by the paper preheating unit 134 and droplets of treatment liquid are ejected by the treatment liquid head 136. Thereupon, the recording medium 114 which is held on the pressure drum 126b is heated by the treatment liquid drying unit 138, and the solvent component (liquid component) of the treatment liquid is evaporated and dried.

By this means, a layer of aggregating treatment agent in a solid state or semi-solid state is formed on the recording medium 114.

The recording medium 114 on which a solid or semi-solid layer of aggregating treatment agent has been formed is transferred from the pressure drum 126b of the treatment liquid deposition unit 106 via the transfer drum 124c to the pressure drum 126c of the ink ejection unit 108. Droplets of corresponding colored inks are ejected respectively from the ink heads 140M, 140K, 140C, 140Y, onto the recording medium 114 held on the pressure drum 126c, in accordance with the input image data.

When ink droplets are deposited onto the aggregating treatment agent layer, then the contact surface between the ink droplets and the aggregating treatment agent layer is a prescribed surface area when the ink lands, due to a balance between the propulsion energy and the surface energy. An aggregating reaction starts immediately after the ink droplets land on the aggregating treatment agent, but the aggregating reaction starts from the contact surface between the ink droplets and the aggregating treatment agent layer. Since the aggregating reaction occurs only in the vicinity of the contact surface, and the coloring material in the ink aggregates while receiving an adhesive force in the prescribed contact surface area upon landing of the ink, then movement of the coloring material is suppressed.

Even if another ink droplet is deposited adjacently to this ink droplet, since the coloring material of the previously deposited ink have already aggregated, then the coloring material does not mix with the subsequently deposited ink, and therefore bleeding is suppressed. After aggregation of the coloring material, the separated ink solvent spreads, and a liquid layer containing dissolved aggregating treatment agent is formed on the recording medium 114.

Thereupon, the recording medium 114 held on the pressure drum 126c is heated by the solvent drying units 142a and 142b, and the solvent component (liquid component) which has been separated from the ink aggregate on the recording medium 114 is evaporated off and dried. As a result, curling of the recording medium 114 is prevented, and furthermore deterioration of the image quality as a result of the presence of the solvent component can be restricted.

The recording medium 114 onto which colored inks have been deposited by the ink ejection unit 108 is transferred from the pressure drum 126c of the ink ejection unit 108 via the transfer drum 124d to the pressure drum 126d of the fixing processing unit 110. After the printing results achieved by the ink ejection unit 108 are read out by the in-line sensor 144 from the recording medium 114 held on the pressure drum 126d, then heating and pressure processing are carried out by the heating rollers 148a and 148b.

When the recording medium 114 is further transferred from the pressure drum 126d to the paper output drum 150, it is conveyed to the paper output platform 152 by the paper output chain 154. The recording medium 114 on which an image has been formed in this way is then conveyed onto the paper output platform 152 by the paper output chain 154 and is stacked on the paper output platform 152.

Image Processing

Figure 8:
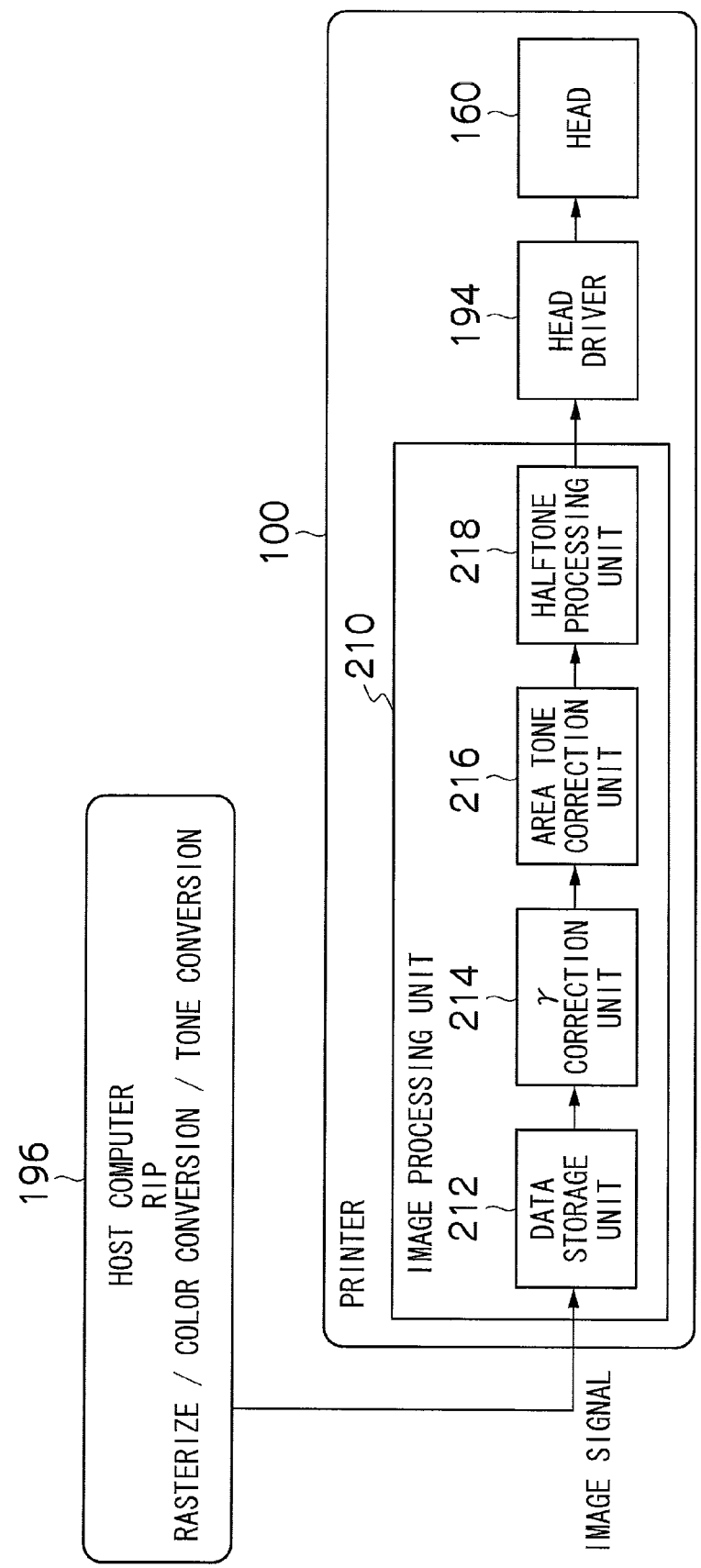
FIG. 8 is a data flow diagram showing image data processing in the inkjet recording apparatus 100.

Next, the sequence of image processing in an inkjet recording apparatus according to an embodiment of the present embodiment will be described. FIG. 8 is a data flow diagram showing image data processing in the inkjet recording apparatus 100.

In the plate manufacturing step, image data defined using Page Description Language (PDL; for example, PostScript (PS) or Portable Document Format (PDF)) is created from page data created by editing image data or text data of various types.

The host computer 196 functions as a processing device which takes the image data of the print object created in the plate manufacturing step and carries out RIP (Raster Image Processor) for conversion to a raster image, RGB to CMYK color conversion processing, tone conversion processing, and the like.

A color conversion processing unit of the host computer 196 employs a generic conversion module that is not designed specifically for a particular output device (printer). Therefore, the host computer 196 converts the RGB signal to CMYK density data for the respective ink colors corresponding to the ink colors provided in the output device (printer), by means of a generic color conversion algorithm, without taking account of effects such as change in the aggregation action created by the treatment liquid in the inkjet recording apparatus 100 forming the output device. If the input original image and the recording resolution of the output machine (nozzle resolution) do not match, then the number of pixels in the input image is converted in accordance with the resolution of the output machine.

In this way, the image data for printing generated by the host computer 196 (CMYK density data) is supplied to the printer (the inkjet recording apparatus 100) through a prescribed communications interface. There are no particular restrictions on the communications method, and for example it is possible to use communications interfaces of various types, such as RS232C, LVDS, CAN, or the like. In implementing the present invention, it is also possible to install the functions such as RIP processing on the printer side.

Image data which has been subjected to tone conversion and color conversion in accordance with the output conditions (for example, the output printer, type of paper and ink) by the host computer 196 is sent to the inkjet recording apparatus 100 (printer) which carries out the printing step, and is stored in a data storage unit 212 (for example, a buffer memory).

As shown in FIG. 8, the inkjet recording apparatus 100 forming the image output device includes an image processing unit 210, which has a data storage unit 212 that temporarily stores image data (CMYK density data) input from the host computer 196, a γ correction unit 214, an area tone correction unit 216 and a halftone processing unit 218.

In the description given below, the inkjet recording apparatus 100 (printer) reproduces a color image by superimposing four colors, C (Cyan), M (Magenta), Y (Yellow) and B (Black). Below, processing in relation to one color, for example, the C (Cyan) plate is described, but similar processing is also carried out in respect of the other three colors. Furthermore, in the case of an inkjet recording apparatus 100 which superimposes more than four colors (for example, six or seven colors), then the processing described below is implemented in respect of the plates of all the colors, in a similar fashion. Processing relating to the plates of respective colors may be carried out by means of parallel processing, in order to speed up processing, or by means of serial processing in order to restrict the hardware (H/W) specification requirements.

When processing for outputting the image data stored in the data storage unit 212 has been started by means of a printing start command device (not shown), the γ correction unit 214 reads out the image data from the data storage unit 212 and carries out the γ correction. The γ correction unit 214 performs conversion using a γ correction table (one-dimensional lookup table (1D-LUT)) obtained by a so-called calibration operation, on the aforementioned image data. Here, the γ correction is processing which makes the output tone characteristics of the printer uniform at all times, by correcting temporal change and individual differences in printers.

Similarly to the conventional printing apparatus, the area tone correction unit 216 carries out tone conversion set for each printing area obtained by dividing the recording medium 114 in the breadthways direction of the paper (main scanning direction, x direction) which is perpendicular to the paper conveyance direction (y direction), on the image data that has been subjected to the γ correction. The area tone correction unit 216 is described hereinafter.

The image data that has been tone corrected for each area is input to the halftone processing unit 218. The halftone processing unit 218 converts the image data having multiple values (for example, 8-bit tones of 256, or 16-bit tones of 65536) to print data having multiple values (dot data for the respective nozzles) corresponding to the number of graduated tones required in the printer, by means of a prescribed algorithm (for example, a systematic threshold method using a threshold value matrix, an error diffusion method, a density pattern method or a dithering method). Here, the number of tones required in the printer are two, because the printer uses two graduated tones; however, with a printer based on the inkjet method, it is also possible to employ 3, 4, 8 or 16 values, or the like, in accordance with the droplet ejection sizes of the ink that can be ejected from the head 160. If the number of graduated tones in the input image data is N and the number of graduated tones in the output print data is M, then there are $N > M \geq 2$ tones. The M tones of the output data are converted to electrical signals for actually driving inkjet printing by the head driver 194, and the signals are supplied to the head 160. By this means, printing is carried out by ejecting ink droplets of volumes corresponding to the input image data from the head 160.

Composition of Area Tone Correction Unit

Figure 9:
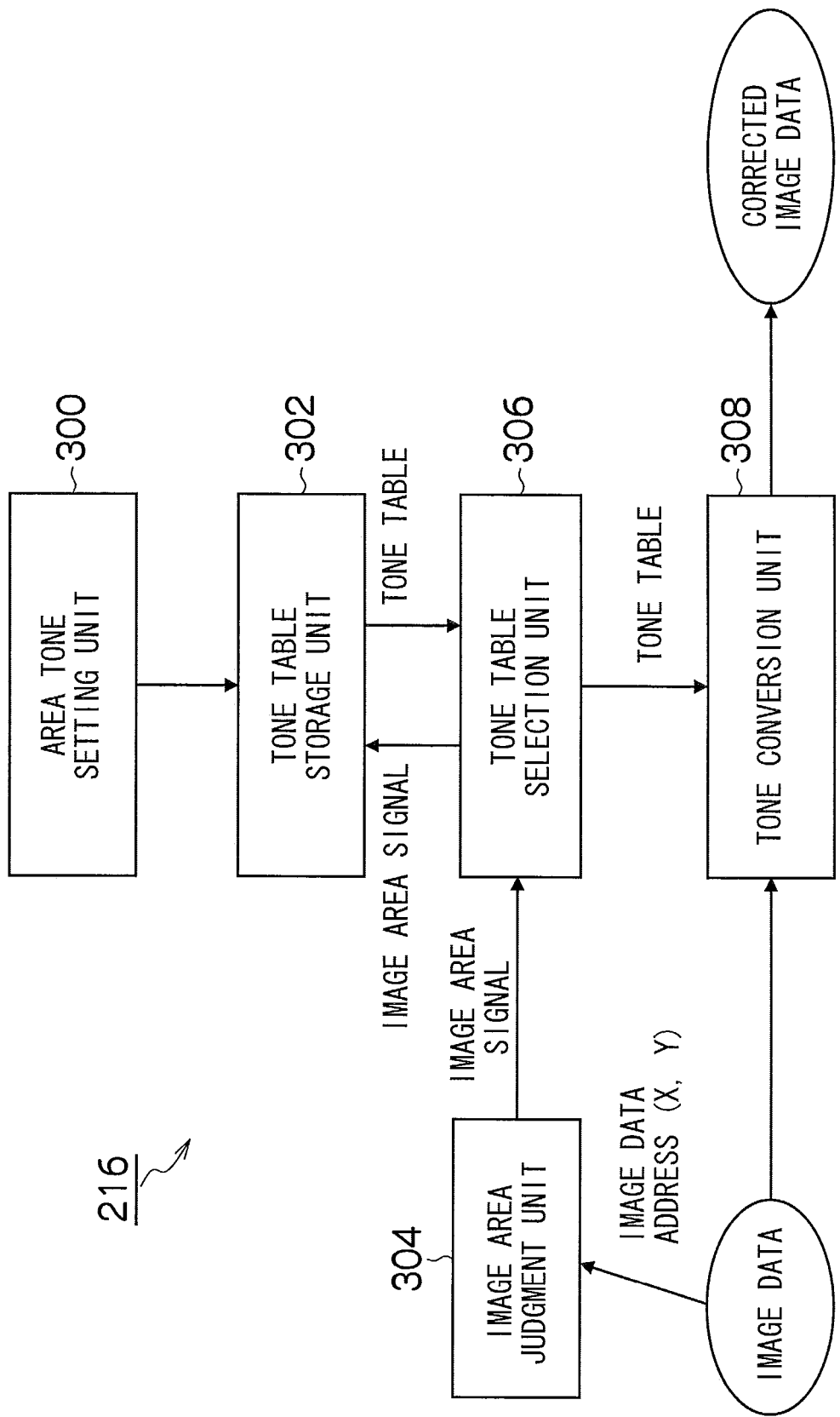
FIG. 9 is a block diagram showing the main composition of an area tone correction unit 216 in a first embodiment of the present invention.

FIG. 9 is a block diagram showing the main composition of the area tone correction unit 216 according to a first embodiment of the present invention.

Figure 18:
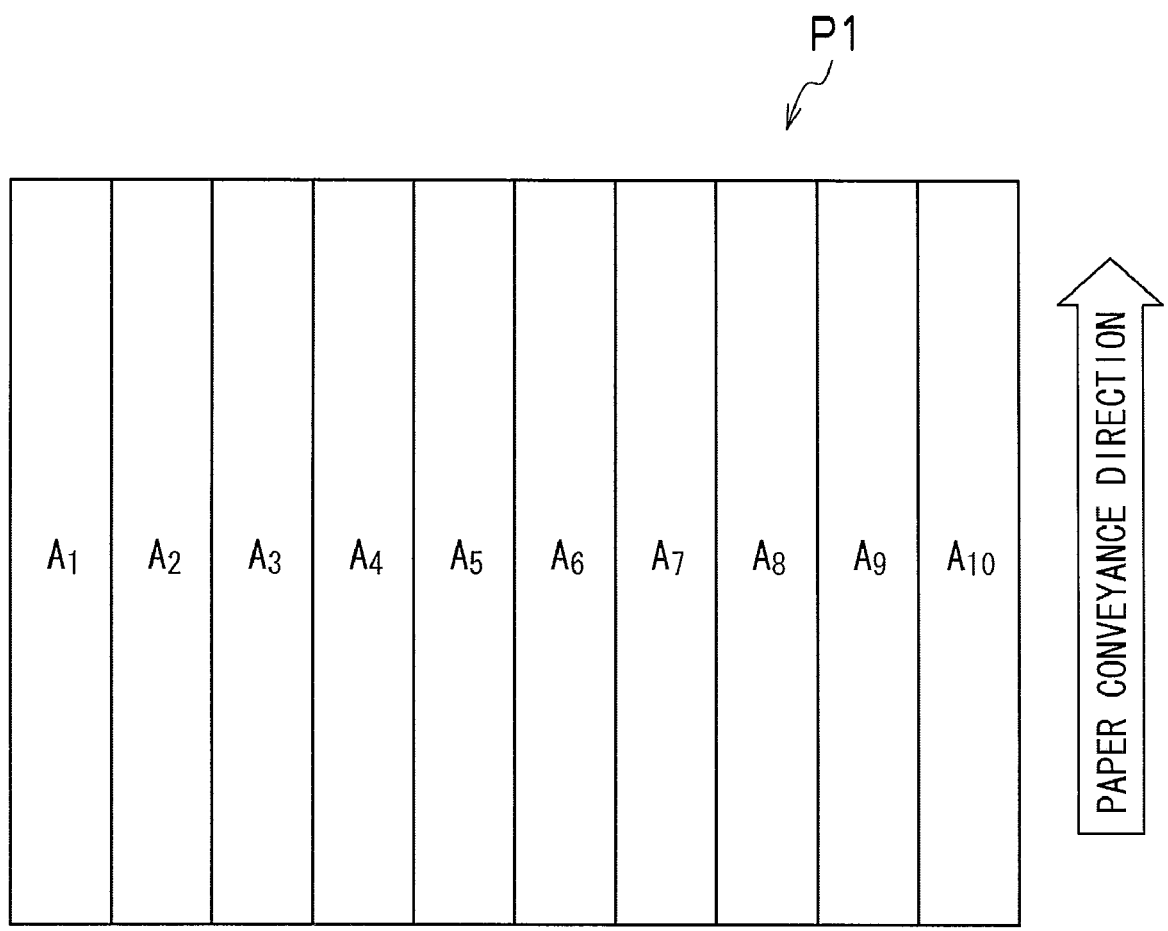
FIG. 18 is a diagram showing an example of a divided area.

An area tone setting unit 300 sets a desired tone conversion curve (one-dimensional lookup table (1D-LUT)) for each divided area (see FIG. 18) obtained by dividing the recording medium 114 in the direction perpendicular to the paper conveyance direction (y direction). The information on the tone conversion curve (1D-LUT) set to correspond to each area is stored as a tone correction table in a tone correction table storage unit 302.

When processing for outputting image data is started by means of the print start command device (not shown), image data is input from the data storage unit 212 to the area tone correction unit 216. An image area judgment unit 304 judges which of the aforementioned divided areas each pixel belongs to, on the basis of the address (x, y) of the pixel in the image data. The image area judgment unit 304 inputs an image area signal indicating the judgment results for the divided area that the pixel belongs to, to a tone correction table selection unit 306.

The tone correction table selection unit 306 inputs the image area signal to the tone correction table storage unit 302, reads out the tone correction table corresponding to the divided region to which the pixel belongs and sets this table in a tone conversion unit 308.

The tone conversion unit 308 carries out tone conversion on the input image data, using the tone conversion curve (1D-LUT) corresponding to the divided region to which the pixel belongs. The corrected image data that has undergone the tone conversion by the tone conversion unit 308 is output to a halftone processing unit 218 and subjected to prescribed processing. Thus, an image based on the corrected image data is created.

Here, the tone conversion curve set in the area tone setting unit 300 can be set freely to any desired tone conversion curve.

Figure 10:
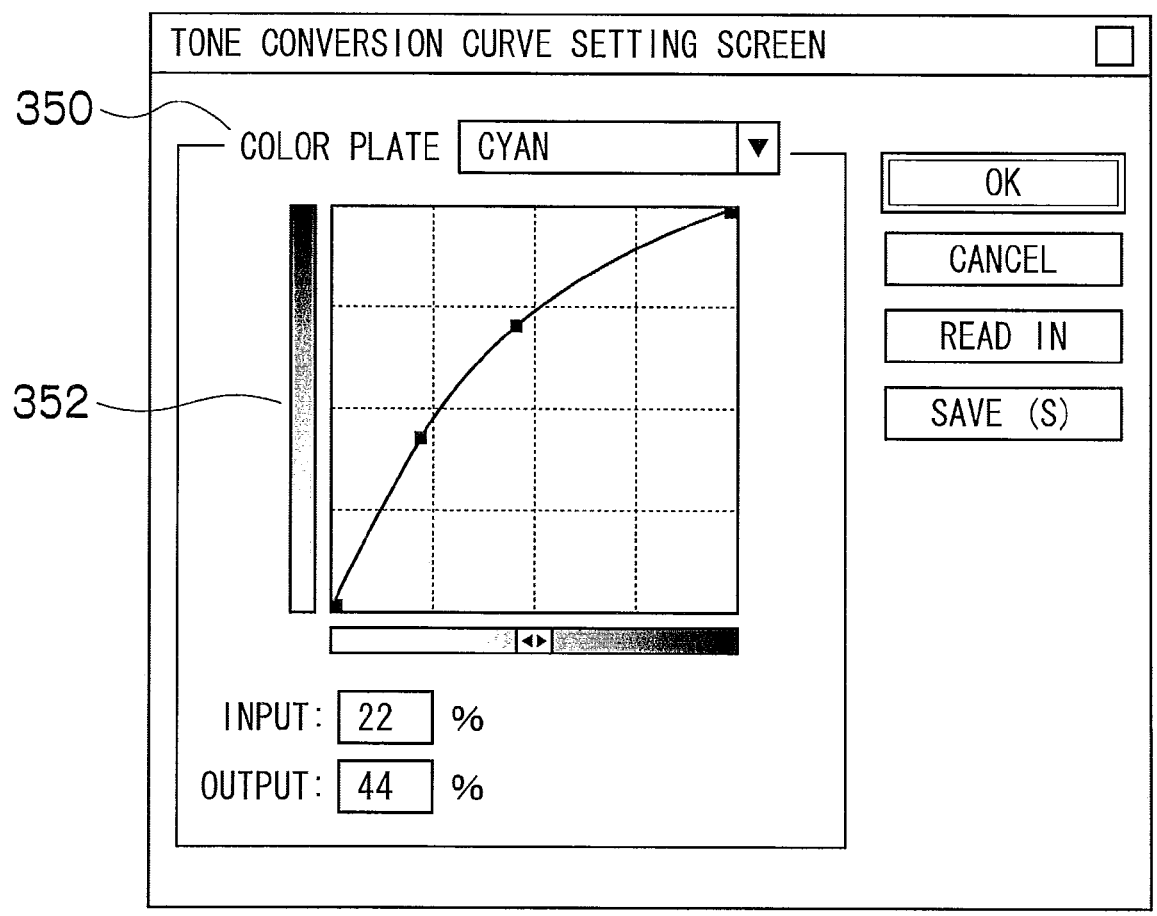
FIG. 10 shows a schematic view of a tone conversion curve setting screen (setup GUI)

FIG. 10 shows a schematic view of a tone conversion curve setting screen (setup GUI).

The tone conversion curve setting screen shown in FIG. 10 is displayed on the display screen of a control station 200, and includes: a drop-down menu 350 for specifying the color plate; a drawing area 352 for drawing a tone conversion curve, an "OK" button for inputting a command to confirm the setup results for the tone conversion curve; a "Cancel" button for inputting a command to close the tone conversion curve setting screen without confirming the setup results for the tone conversion curve; a "Save" button for inputting a command to save the setup results for the tone conversion curve; and a "Read" button for inputting a command for reading in the saved tone conversion curve. The operator is able to set a tone conversion curve for each color plate by using a prescribed input device (for example, a mouse or touch panel) attached to the control station 200 to control the settings screen.

It is also possible to preset special tone conversion curves in advance and to select one of these curves.

Furthermore, it is also possible to preset a plurality of tone conversion curves which gradually vary, in advance, and to select a desired curve from these tone conversion curves.

Figure 11:
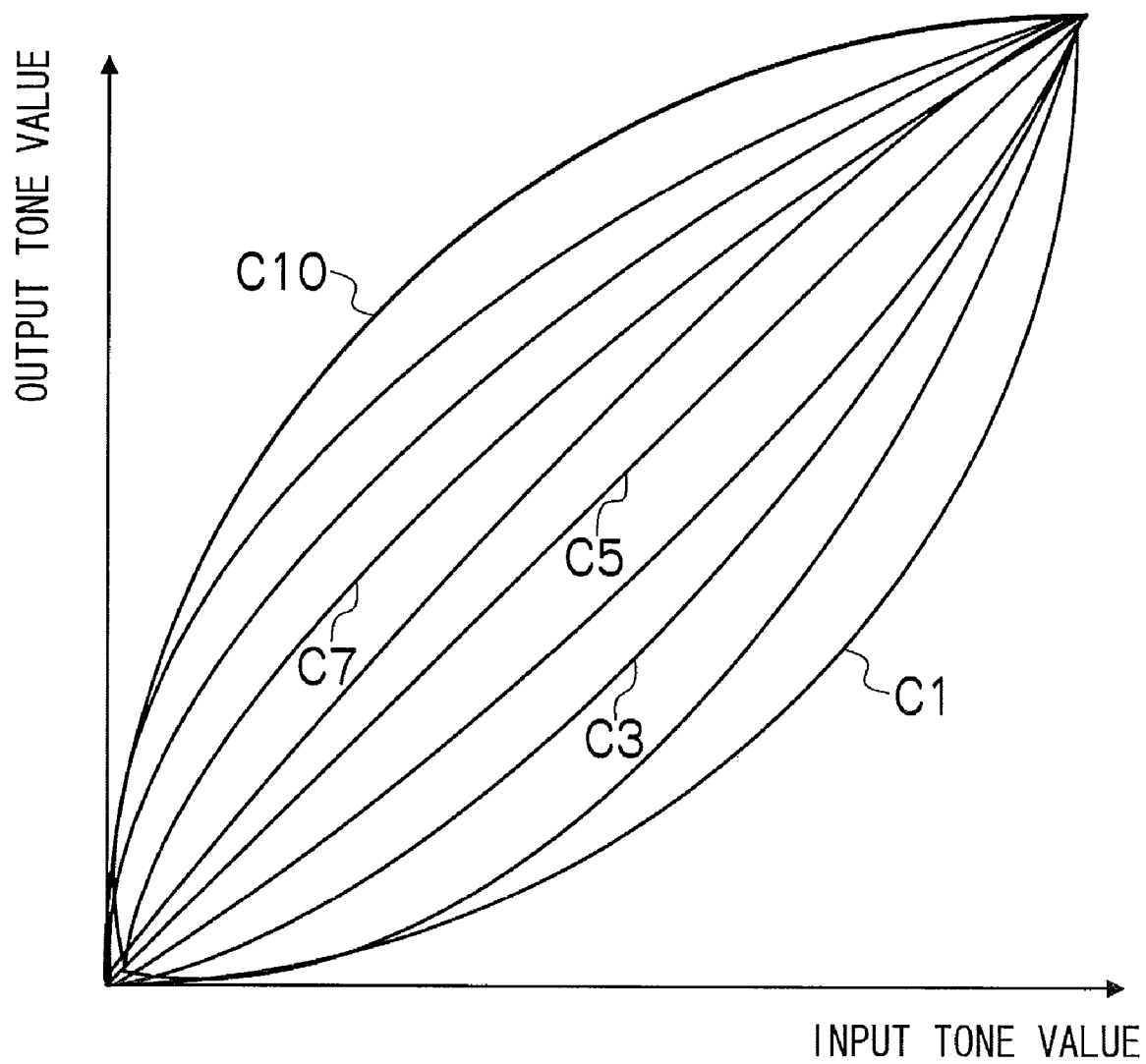
FIG. 11 is a graph showing examples of tone conversion curves which gradually change.

FIG. 11 is a graph showing an example of tone conversion curves which gradually vary.

In FIG. 11, the curve C5 indicates a tone conversion curve which is similar to the tone conversion curve in the case of standard ink key settings. The curve C1 shows a tone conversion curve when the ink output volume has been restricted to the greatest extent from the standard state (curve C5). The curve C10 indicates the tone conversion curve when the ink key has been opened to the greatest extent. The intermediate curves C2, C3, . . . , correspond to tone conversion curves obtained when the ink key is gradually opened or closed.

Figure 19:
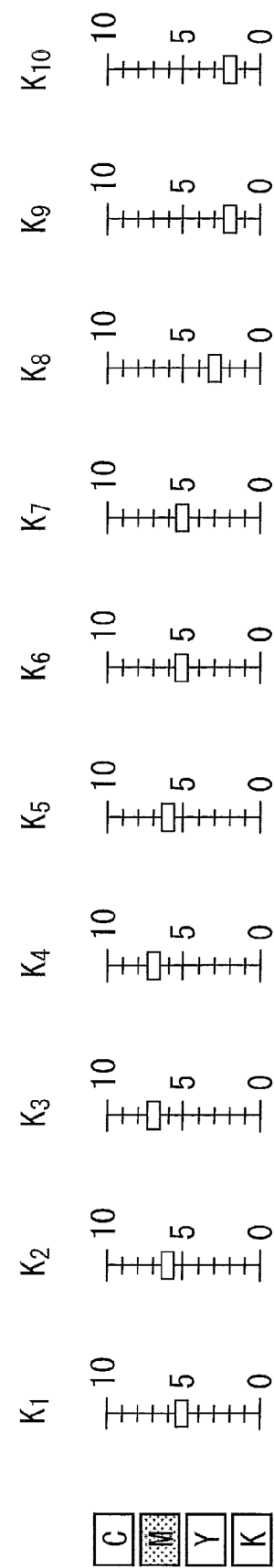
FIG. 19 is a diagram showing an example of the composition of ink keys.

The operator of the printer is able to select a desired tone conversion curve from the tone conversion curves which gradually change shown in FIG. 10, at the control station 200 which is connected to the printer. An input device similar to an ink key (see FIG. 19) can be used on the GUI for setting the tone conversion curve for each area. By this means, the operator can carry out tone conversion with similar operability to that of the conventional offset printing apparatus.

Prevention of Stripe-Shaped Non-Uniformities

Here, if the tone conversion curves in adjacent areas are different to each other, then stripe-shape non-uniformity may occur. Therefore, in the present embodiment, smoothing is applied in cases where there is a sudden change in the tone conversion curves between adjacent areas.

Figure 12:
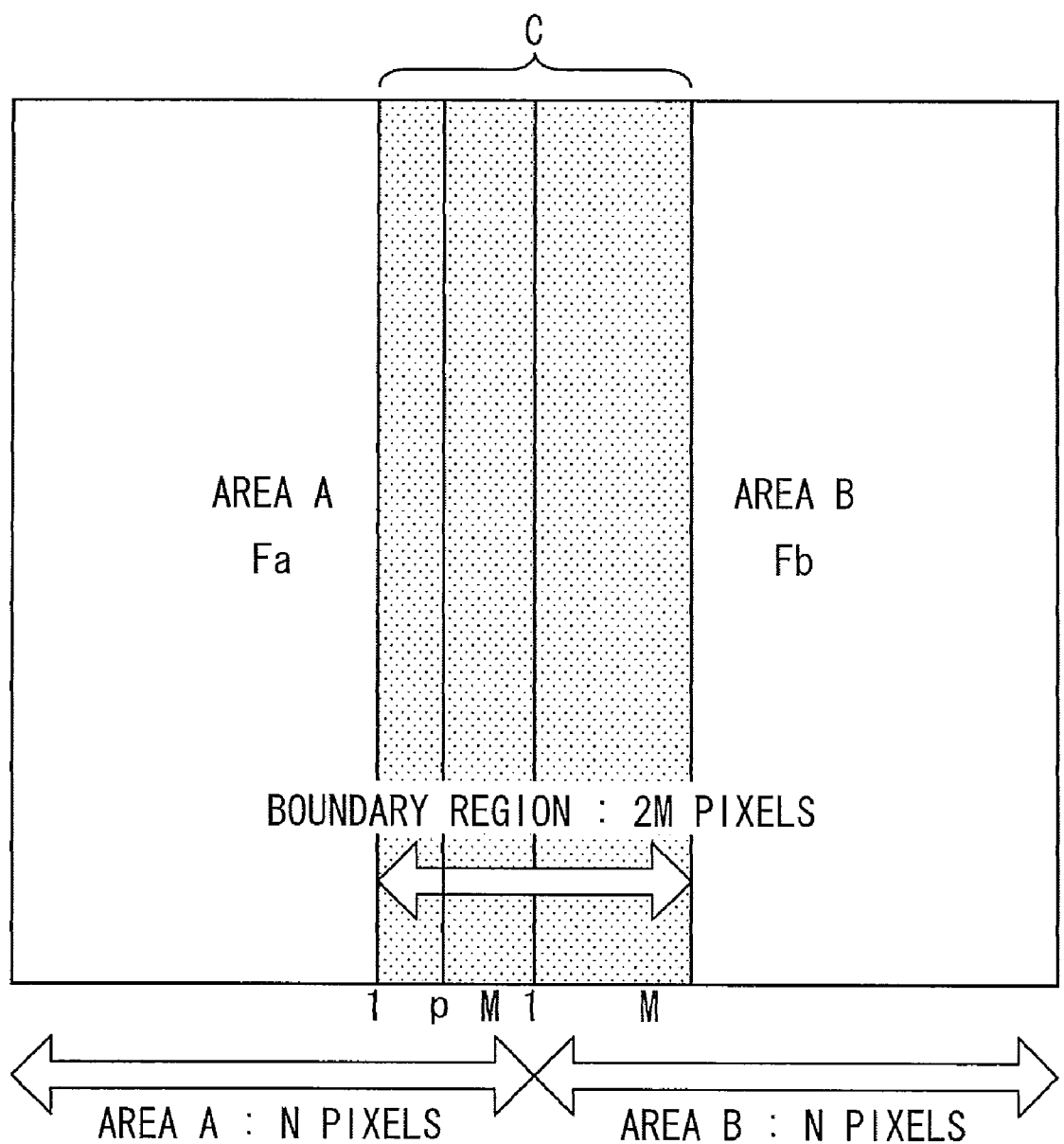
FIG. 12 is a plan diagram showing a smoothing area.
Figure 13:
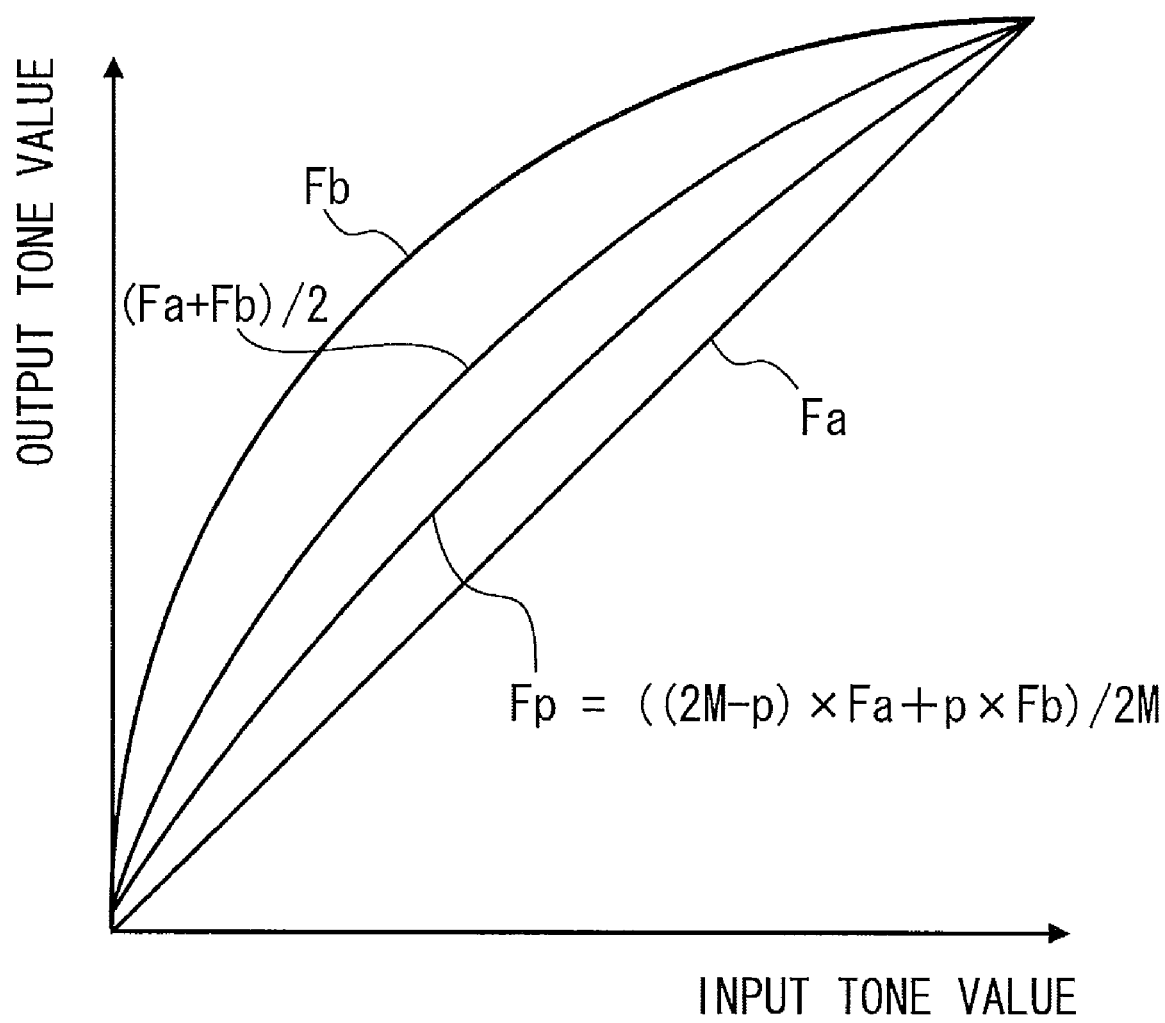
FIG. 13 is a graph showing tone conversion curves for smoothing.

FIG. 12 is a plan diagram showing a smoothing area, and FIG. 13 is a graph showing a tone conversion curve for smoothing.

The tone conversion curve corresponding to the pixels of the area A (N pixels wide) is taken to be Fa and the tone conversion curve corresponding to the pixels of the region B (N pixels wide) adjacent to the area A is taken to be Fb. As shown in FIG. 12, a smoothing area C which is centered on the mutually adjacent edges of the areas A and B and which extends for M pixels respectively into the areas A and B is provided. Here, the value of M can be set as desired by the operator. For example, M=N/2. For instance, the width M of the smoothing area in the x direction can be altered in accordance with the picture and the characteristics of the printer.

Thereupon, the tone conversion curve Fp for the area of the p-th pixel from the area A side of the boundary area C (from the left-hand side in FIG. 12) is calculated as follows:

$$Fp=\{(2M-p)\times Fa+p\times Fb\}/2M.$$

Thereby, the tone conversion curve is gradually converted from Fa to Fb in the boundary area C, and therefore it is possible to prevent stripe-shape non-uniformities parallel to the direction of paper conveyance.

According to the present embodiment, by setting a desired tone conversion curve (1D-LUT) for each of the divided areas on the recording medium 114 and carrying out tone conversion of the image data using this tone conversion curve, it is possible to carry out color and tone conversion, quickly and easily, in the printing department. Furthermore, according to the present embodiment, by preparing tone conversion curves that gradually change, in advance, it is possible to adjust colors with a similar operating feel to the ink keys used in the conventional offset printing apparatus.

Second Embodiment

Next, a second embodiment of the present invention will be described. In the following description, parts of the composition which are similar to the first embodiment described above are omitted from the explanation.

The present embodiment makes it possible to adjust color and tone in respect of divided regions which are divided in the paper conveyance direction, also.

FIG. 14 shows a schematic view of a screen for setting tone adjustment according to the second embodiment of the present invention.

The tone adjustment screen shown in FIG. 14 is displayed on the monitor screen of the control station 200, and includes an area specification screen 400 for inputting an instruction specifying a desired area on the recording medium 114, a color plate specification button 402 for specifying a color plate (C, M, Y, K), and a tone conversion curve setting operation unit 404 for inputting an instruction specifying a tone conversion curve for each area, for each specified color plate. The operator is able to set a tone conversion curve for each color plate by using a prescribed input device (for example, a mouse or touch panel) attached to the control station 200 to control the settings screen.

In the embodiment shown in FIG. 14, the full surface of the recording medium 114 is divided into 7 unit areas in the paper conveyance direction and 10 unit areas in the breadthways direction of the paper, and each area can be specified on the basis of these unit areas. The number and arrangement of the unit areas are not limited to the embodiment shown in FIG. 14. For instance, it is also possible to set areas in pixel units by inputting coordinates.

Moreover, in the embodiment shown in FIG. 14, it is possible to gradually change the tone conversion curve by means of a scale type operating unit 404, but the operating unit 404 is not limited to this. For example, it is also possible to enable the tone conversion curves corresponding to the respective areas to be set by means of a GUI similar to that in FIG. 10.

The area tone setting unit 300 sets a two-dimensional area on the recording medium 114 in accordance with inputs from the area specification screen 400. The area setting results are displayed on the area specification screen 400 in distinct colors, as shown in FIG. 14.

The area judgment unit 304 judges the image area to which each pixel belongs, by referring to both (X, Y).

The tone correction table selection unit 306 sets a tone conversion curve (1D-LUT) for each area set by the area tone setting unit 300, in accordance with inputs from the tone conversion curve setting operation unit 404. The area setting information (for example, coordinates information), and tone conversion curve setting results for each area are stored in the tone correction table storage unit 302.

The tone conversion unit 308 carries out tone conversion on the input image data, using the tone conversion curve (1D-LUT) corresponding to the divided region to which the pixel belongs. The corrected image data that has undergone the tone conversion by the tone conversion unit 308 is output to the halftone processing unit 218 and subjected to prescribed processing. Thus, an image based on the corrected image data is created.

In the embodiment shown in FIG. 14, the operator is able to set any desired area on the recording medium 114, but it is also possible to set (assign) image areas on the recording medium 114 in advance, and to allocate a desired image for each area.

Furthermore, in the description given above, prevention of "stripe-shaped non-uniformity" occurring between areas which are adjacent in the X direction (breadthways direction of the paper) has been described (see FIG. 12 and FIG. 13), and it is also possible to prevent "stripe-shaped non-uniformity" by carrying out similar calculations between areas which are adjacent in the Y direction (paper conveyance direction).

Figure 15:
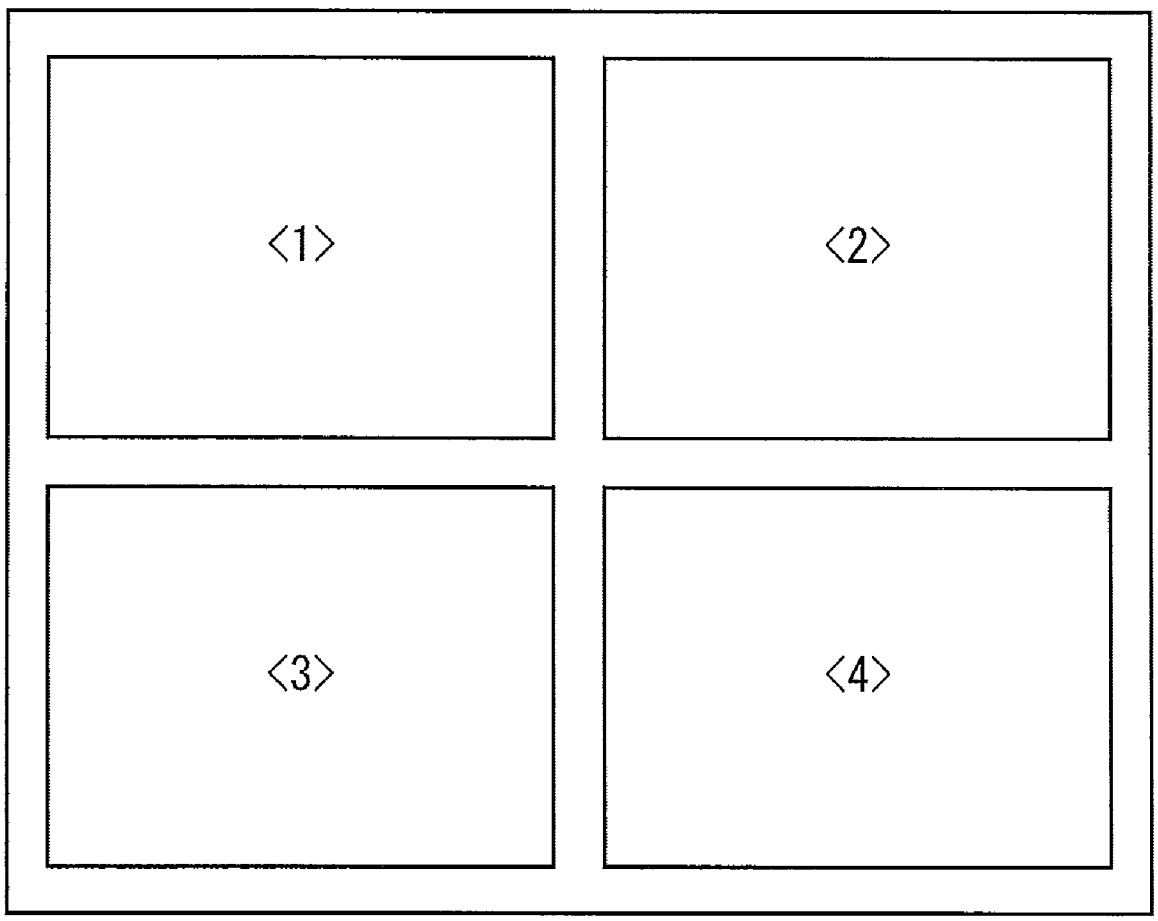
FIG. 15 is a diagram showing a schematic view of an example of setting image areas.
Figure 16A:
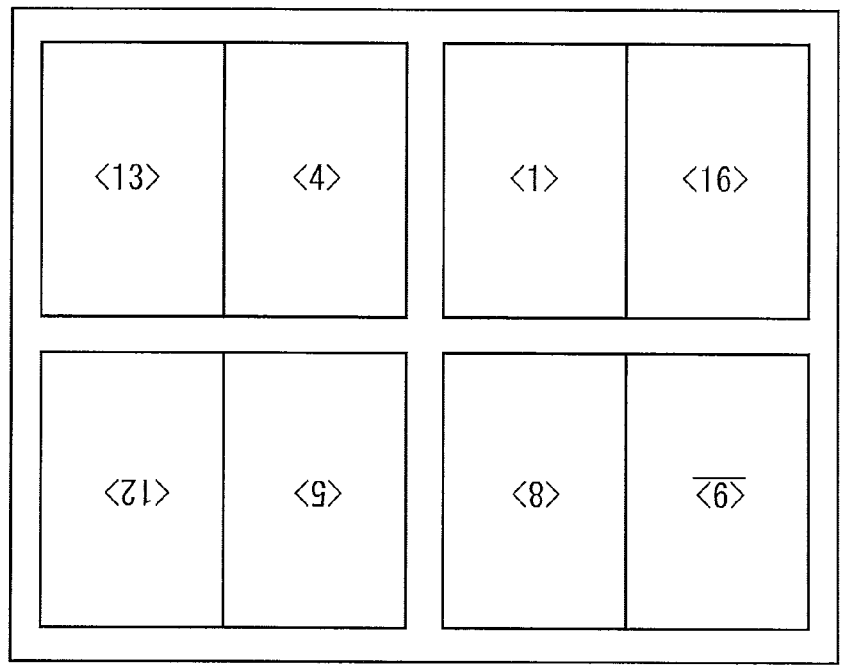
FIGS. 16A and 16B are diagrams showing schematic views of an example of setting image areas.
Figure 16B:
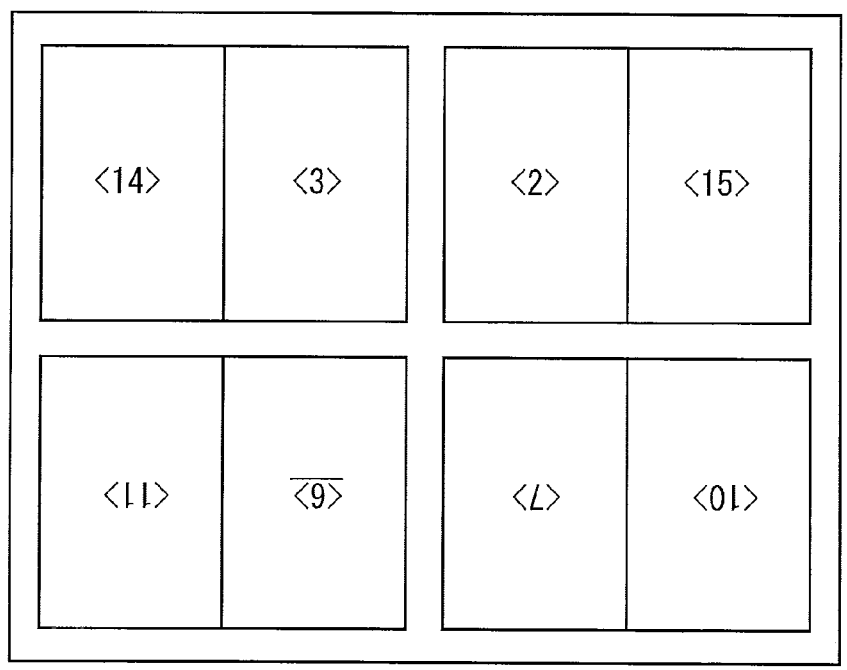

FIG. 15 and FIGS. 16A and 16B show schematic views of examples of image area settings. FIG. 15 shows an example in which four A4-sized image areas <1> to <4> are arranged on a recording medium (paper) 114 of the half Kiku size. Furthermore, FIGS. 16A and 16B show an example where eight image faces are allocated on a surface of paper of the half Kiku size, and adding together the front and rear surfaces, a total of 16 image areas <1> to <16> are allocated. In the examples shown in FIG. 15 and FIGS. 16A and 16B, a desired image is assigned to each of the predetermined image areas, and tone conversion curves suited to each image can be set.

According to the present embodiment, it is possible to adjust the color using different tone conversion curves for the respective image areas arranged in the paper conveyance direction, which could not be adjusted in the conventional offset printing apparatus.

Third Embodiment

Next, a third embodiment of the present invention will be described. In the following description, parts of the composition which are similar to the embodiments described above are omitted from the explanation.

The present embodiment corrects non-uniformities by combining the tone conversion curves in the above-described embodiments and a lookup table (LUT) for correcting non-uniformities.

Figure 17:
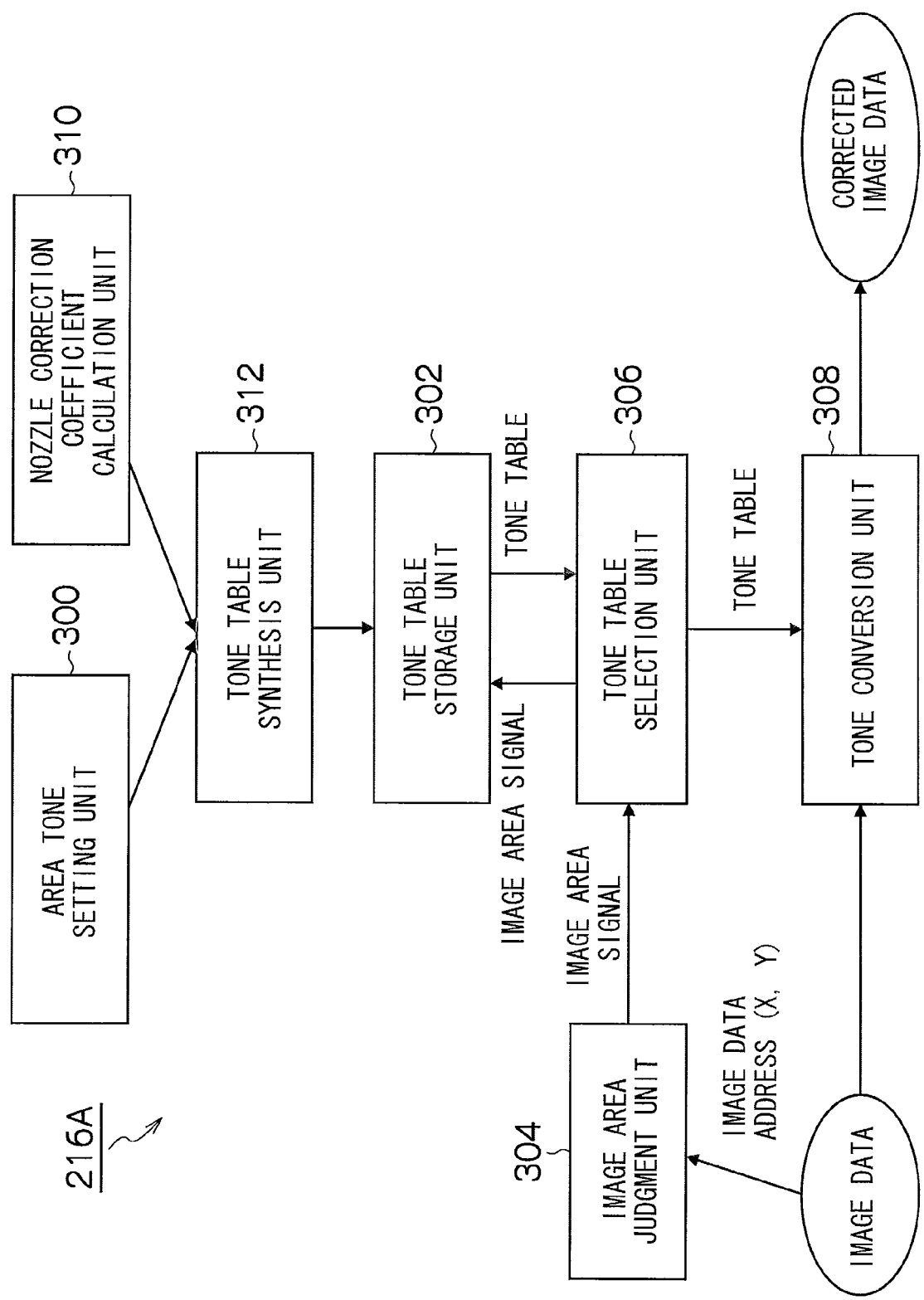
FIG. 17 is a block diagram showing the composition of an area tone correction unit in a third embodiment of the present invention.

FIG. 17 is a block diagram showing the composition of an area tone correction unit according to the third embodiment of the present invention.

As shown in FIG. 17, the area tone correction unit 216A according to the present embodiment further includes a nozzle correction coefficient calculation unit 310 and a tone correction table synthesis unit 312.

The nozzle correction coefficient calculation unit 310 calculates nozzle correction coefficients for correcting ejection failure and non-uniformities in each of the nozzles 161 of the recording head 12. Here, the nozzle correction coefficients can be calculated in advance before carrying out printing, by means of the method described in Japanese Patent Application Publication No. 2007-160748, for example. In the case of a single-pass printing apparatus in which the number of nozzles is n, for example, the nozzle correction coefficient calculation unit 310 creates n one-dimensional lookup tables (LUT) $F_n(p)$.

On the other hand, the area tone setting unit 300 sets a tone conversion curve (one-dimensional LUT) $G_i(p)$ for each divided area i established on the recording medium 114. The method of setting the tone conversion curve (one-dimensional LUT) $G_i(p)$ is similar to that of the first and second embodiments described above.

The tone correction table synthesis unit 312 synthesizes a tone correction table by combining the tone conversion curve $G_i(p)$ set by the area tone setting unit 300 and the nozzle correction coefficient $F_n(p)$. Here, the tone correction table synthesis unit 312 synthesizes a tone correction table including a one-dimensional LUT: $F_{n=j, \ldots, k}(G_i(p))$ (where n=j, ..., k indicates the number of nozzles in the x direction (the direction of arrangement of the nozzles) in the divided area i) that is obtained by combining in series the tone conversion curve $G_i(p)$ for each divided area i, and the nozzle correction coefficient $F_{n=j, \ldots, k}(p)$ corresponding to the divided area. This tone correction table is output to the tone correction table storage unit 302.

When processing for outputting image data is started by means of the print start command device (not shown), the image data is input from the data storage unit 212 to the area tone correction unit 216. The image area judgment unit 304 judges which of the aforementioned divided areas each pixel belongs to, on the basis of the address (x, y) of the pixel in the image data. The image area judgment unit 304 inputs an image area signal indicating the judgment results for the divided area that the pixel belongs to, to the tone correction table selection unit 306.

The tone correction table selection unit 306 inputs the image area signal to the tone correction table storage unit 302, reads out the tone correction table corresponding to the divided region to which the pixel belongs and sets this table in the tone conversion unit 308.

The tone conversion unit 308 carries out tone conversion on the input image data, using the tone conversion curve (1D-LUT) corresponding to the divided region to which the pixel belongs. The corrected image data that has undergone the tone conversion by the tone conversion unit 308 is output to the halftone processing unit 218 and subjected to prescribed processing. Thus, an image based on the corrected image data is created.

According to the present embodiment, it is possible to correct density non-uniformities caused by nozzle defects (ejection failures), at the same time as carrying out color and tone conversion quickly and easily in the printing department.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:
1. An image forming apparatus, comprising:
    an area tone setting device which sets an arbitrary tone correction table for each of image forming areas obtained by dividing a recording medium into a plurality of areas;
    a tone correction table storage device which stores tone correction tables set respectively for the image forming areas by the area tone setting device;

an area judgment device which judges the image forming areas on which respective pixels constituting input image data are to be printed;
a tone correction table selection device which selects from the tone correction table storage device one of the tone correction tables corresponding to the image forming area judged by the area judgment device;
a tone correction device which performs tone correction of each pixel constituting the input image data, using the tone correction table selected by the tone correction table selection device;
a density correction table storage device which stores a density correction table for each of nozzles of an inkjet head to be used when recording an image on the recording medium; and
a tone correction table synthesis device which synthesizes a synthesized tone table by combining the tone correction table set by the area tone setting device and the density correction table,
wherein the tone correction device carries out tone correction for respective pixels constituting the input image data by using the synthesized tone correction table.

2. The image forming apparatus as defined in claim 1, wherein the image forming areas are strip-shaped areas divided in parallel to a conveyance direction in which the recording medium is conveyed when an image is formed on the recording medium.

3. The image forming apparatus as defined in claim 1, wherein the image forming areas are areas divided in a perpendicular direction and a parallel direction with respect to a conveyance direction in which the recording medium is conveyed when an image is formed on the recording medium.

4. The image forming apparatus as defined in claim 1, further comprising an area setting device which sets the image forming areas on the recording medium in accordance with an input from an operator.

5. The image forming apparatus as defined in claim 1, wherein:
the tone correction table storage device stores a set of the tone correction tables which gradually change; and
the area tone setting device selects one of the tone correction tables to be used for the image forming area in accordance with an input from an operator.

6. The image forming apparatus as defined in claim 1, further comprising a smoothing device which, in a case where a mutually different first and second tone correction tables are selected by the area tone setting device for first and second image forming areas that are mutually adjacent on the recording medium, carries out a smoothing process for gradually changing the tone correction table used in a boundary portion between the first image forming area and the second image forming area from the first tone correction table to the second tone correction table.

7. A printing apparatus, comprising:
the image forming apparatus as defined in claim 1; and
a printing device which prints an image based on the input image data that has been tone corrected by the image forming apparatus, onto the recording medium, while conveying the recording medium in a prescribed conveyance direction.

8. An image forming method, comprising:
an area tone setting step of setting an arbitrary tone correction table for each of image forming regions obtained by dividing a recording medium into a plurality of areas;
a tone correction table storage step of storing tone correction tables set respectively for the image forming areas in the area tone setting step;
an area judgment step of judging the image forming areas on which respective pixels constituting input image data are to be printed;
a tone correction table selection step of selecting one of the tone correction tables corresponding to the image forming area judged in the area judgment step from the tone correction tables stored in the tone correction table storage step;
a tone correction step of performing tone correction of each pixel constituting the input image data in use of the tone correction table selected in the tone correction table selection step;
a density correction table storage step of storing a density correction table for each of nozzles of an inkjet head to be used in recording an image on the recording medium; and
a tone correction table synthesis step of synthesizing a synthesized tone table by combining the tone correction table set in the area tone setting step and the density correction table,
wherein in the tone correction step, tone correction is carried out for respective pixels constituting the input image data by using the synthesized tone correction table.

9. The image forming method as defined in claim 8, wherein the image forming areas are strip-shaped areas divided in parallel to a conveyance direction in which the recording medium is conveyed when an image is formed on the recording medium.

10. The image forming method as defined in claim 8, wherein the image forming areas are areas divided in a perpendicular direction and a parallel direction with respect to a conveyance direction in which the recording medium is conveyed when an image is formed on the recording medium.

11. The image forming method as defined in claim 8, further comprising an area setting step of setting the image forming areas on the recording medium in accordance with an input from an operator.

12. The image forming method as defined in claim 8, wherein:
a set of the tone correction tables which gradually change are stored in the tone correction table storage step; and
in the area tone setting step, one of the tone correction tables to be used for the image forming area is selected from the tone correction tables in accordance with an input from an operator.

13. The image forming method as defined in claim 8, further comprising a smoothing step of, in a case where a mutually different first and second tone correction tables are selected in the area tone setting step for first and second image forming areas that are mutually adjacent on the recording medium, carrying out a smoothing process for gradually changing the tone correction table used in a boundary portion between the first image forming area and the second image forming area from the first tone correction table to the second tone correction table.

* * * * *